United States Patent

[11] 3,573,747

[72] Inventors Charles W. Adams
Lexington, Mass.;
Herbert R. Behrens; Jerome M. Pustilnik,
New York, N.Y.; John T. Gilmore, Jr.,
Acton, Mass.
[21] Appl. No. 801,455
[22] Filed Feb. 24, 1969
[45] Patented Apr. 6, 1971
[73] Assignee Institutional Networks Corporation
New York, N.Y.

[54] INSTINET COMMUNICATION SYSTEM FOR EFFECTUATING THE SALE OR EXCHANGE OF FUNGIBLE PROPERTIES BETWEEN SUBSCRIBERS
18 Claims, 11 Drawing Figs.

[52] U.S. Cl. .................................................. 340/172.5,
340/154
[51] Int. Cl. ...................................................... G06f 15/24
[50] Field of Search .......................................... 340/154;
235/157; 340/172.5

[56] References Cited
UNITED STATES PATENTS

| | | | |
|---|---|---|---|
| 3,181,124 | 4/1965 | Hammel | 340/172.5 |
| 3,241,117 | 3/1966 | Schottle et al. | 340/172.5 |
| 3,245,045 | 4/1966 | Randlev | 340/172.5 |
| 3,249,919 | 5/1966 | Scantlin | 340/172.5 |
| 3,259,886 | 7/1966 | Singer et al. | 340/172.5 |
| 3,281,789 | 10/1966 | Willcox et al. | 340/172.5 |
| 3,297,996 | 1/1967 | Grady | 340/172.5 |
| 3,344,401 | 9/1967 | MacDonald et al. | 340/172.5 |

Primary Examiner—Gareth D. Shaw
Attorneys—Kenyon and Kenyon and Reilly Carr and Chapin ABSTRACT: This disclosure is directed to an apparatus and method of automatically, anonymously and equitably buying and selling fungible properties between subscribers. The specific embodiment described in the disclosure relates to the buying and selling of securities wherein a communication system pursuant to this invention is described which permits institutional investors to communicate anonymously with each other for the purpose of arranging block trades of listed and over-the-counter securities. Said system comprises a centralized data storage unit, a digital computer, a plurality of subscriber terminals and a plurality of communication links established therebetween. The method of the system comprises the steps of (1) booking unfilled buy offers including associated price and quantity parameters on a buy offer list in a priority sequence according to a first predetermined program, (2) booking unfilled sell offers including associated price and quantity parameters on a sell offer list in a priority sequence according to a second predetermined program, (3) comparing in said priority sequence, the price and quantity parameters of each incoming offer with the corresponding parameters of each offer on the complementary one of said lists, (4) transacting said received offer with the higher priority offers on said complementary list if said incoming offer can be matched against one or more offers on the complementary offer list, and (5) placing the untransacted portion of said received offer on the corresponding one of said lists in a priority sequence according to the corresponding one of said predetermined programs if said incoming offer cannot be completely matched against offers on complementary offer list.

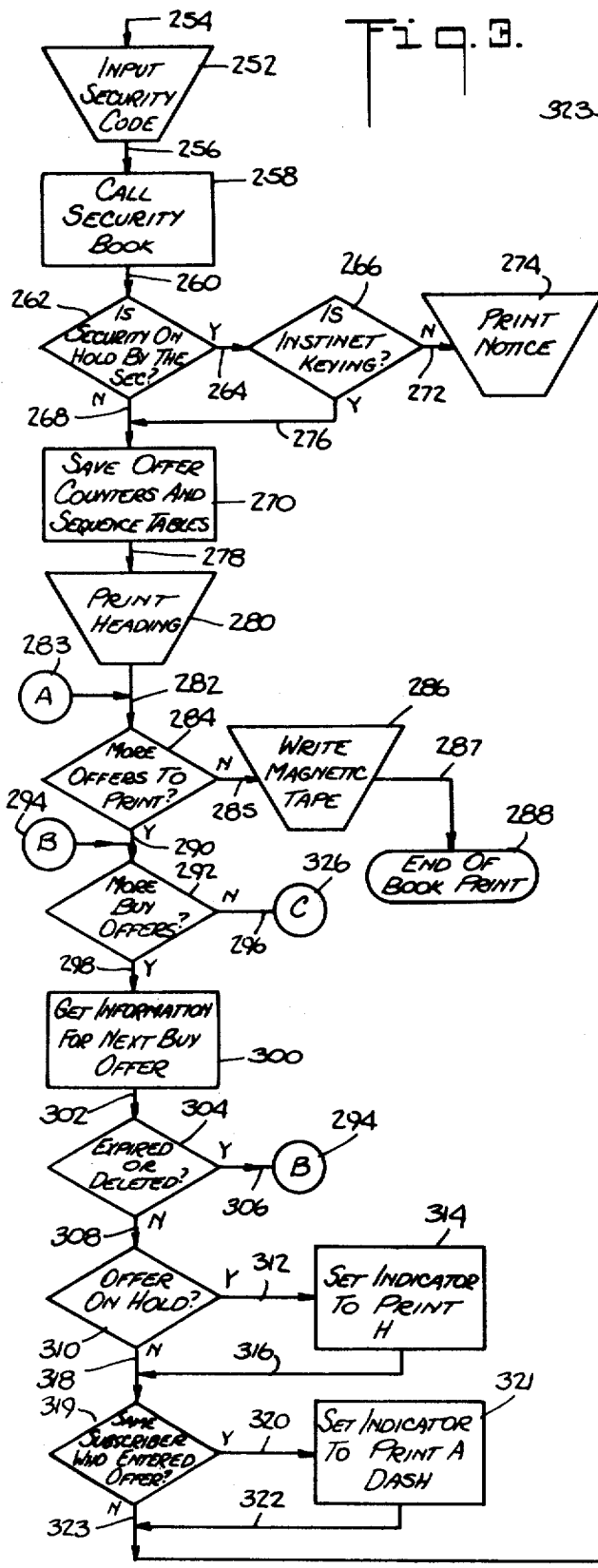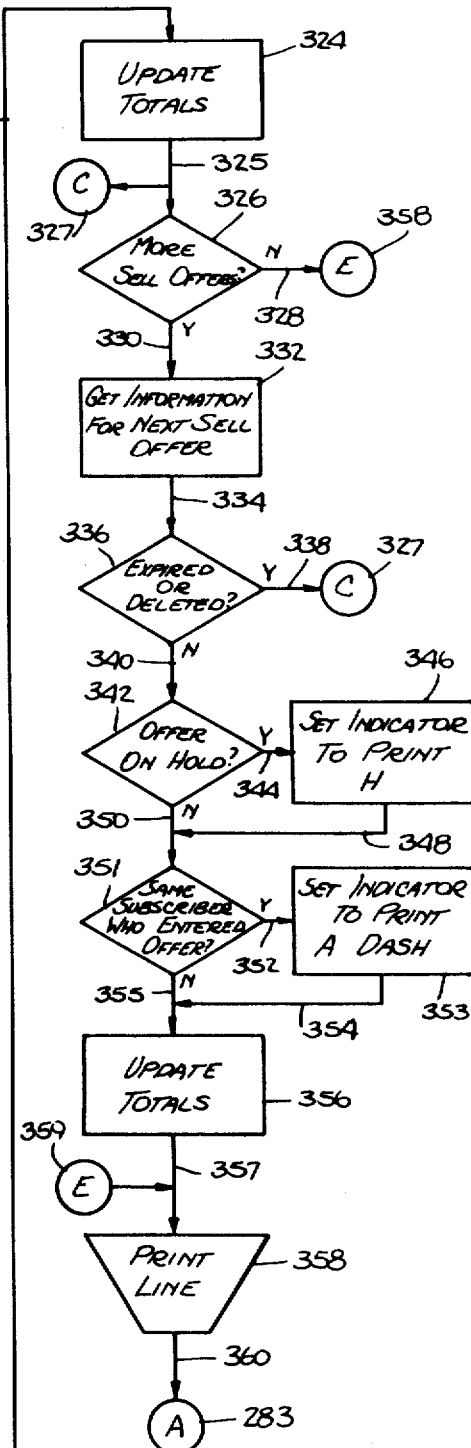
Fig. 3.

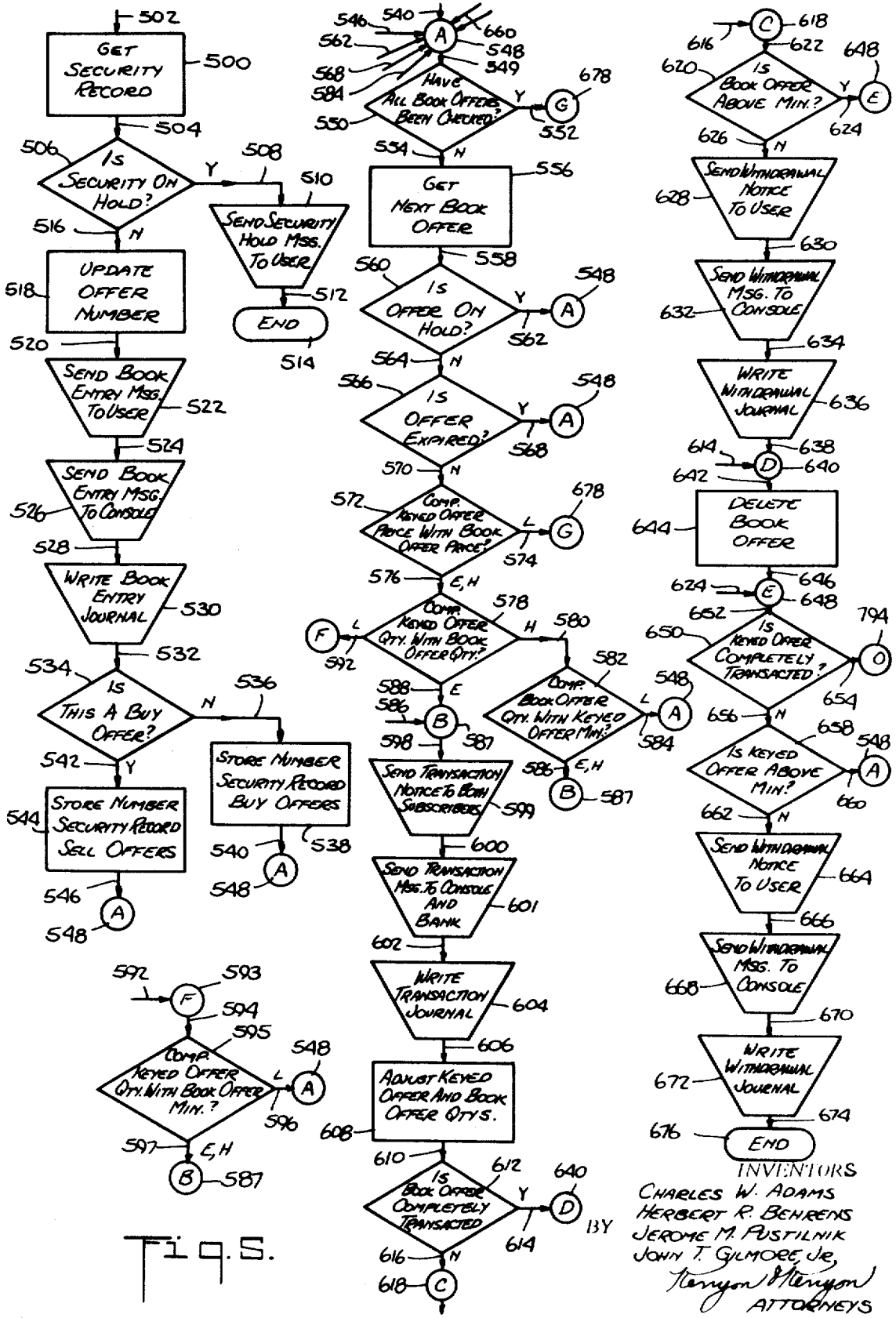

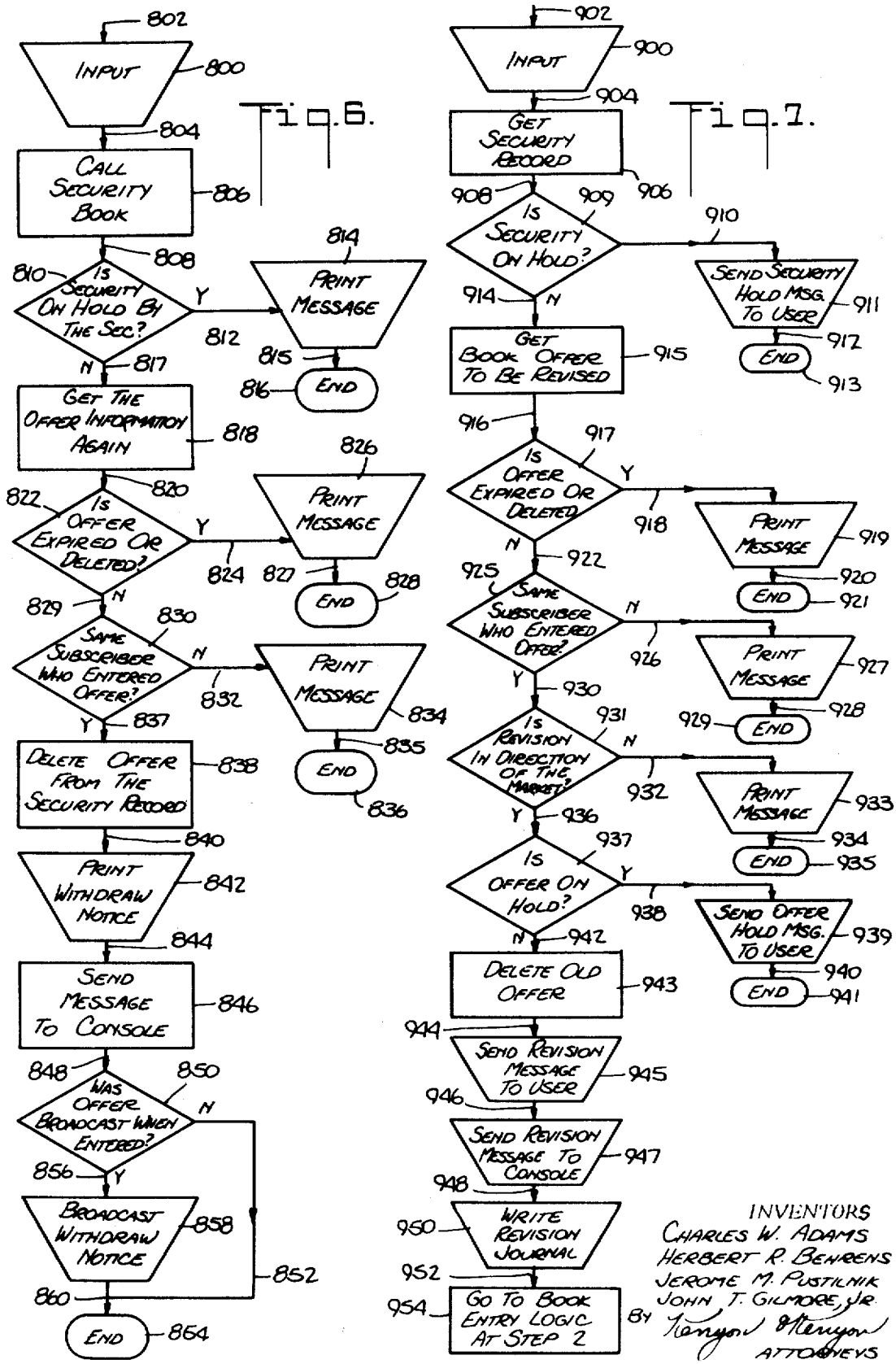

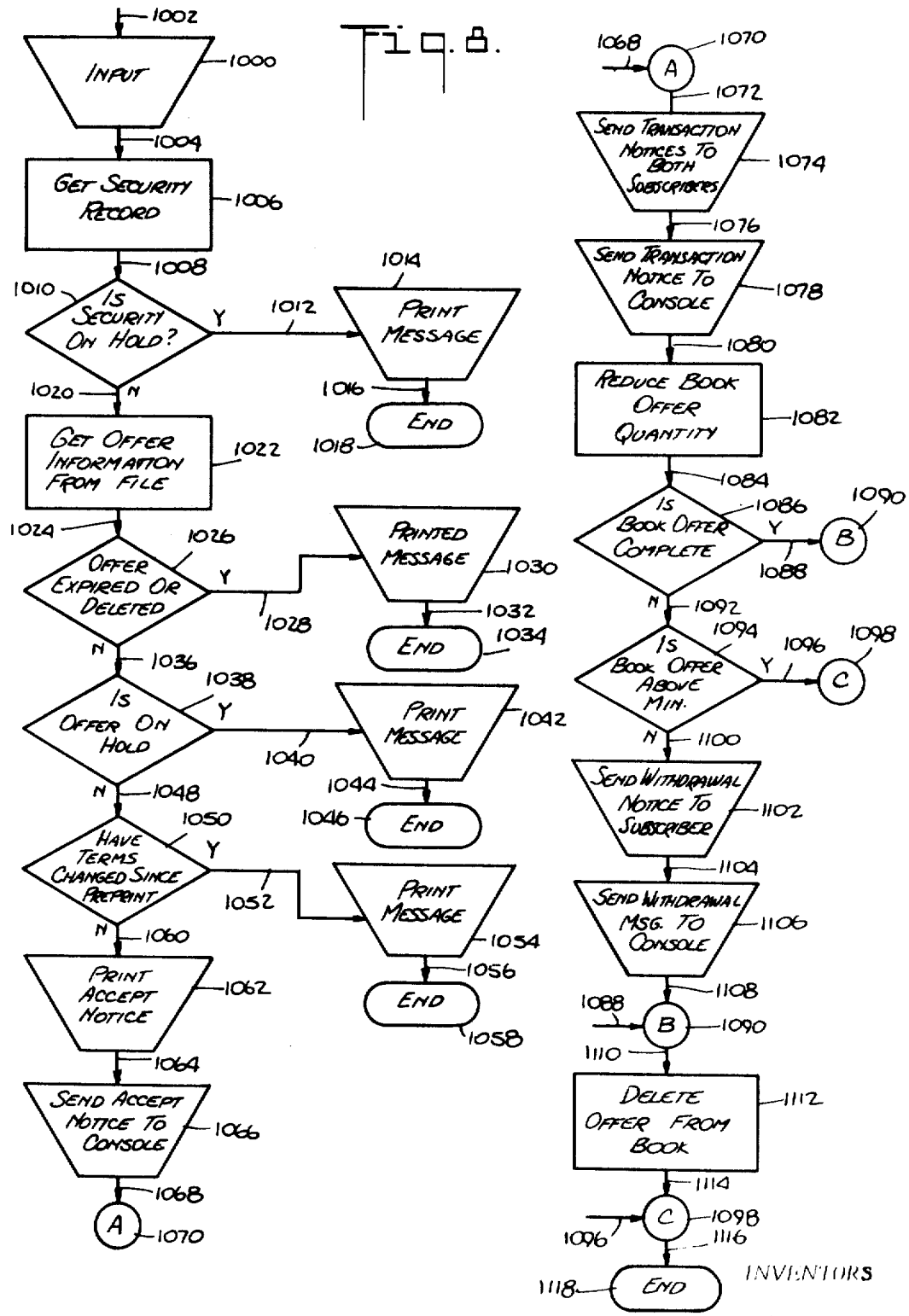

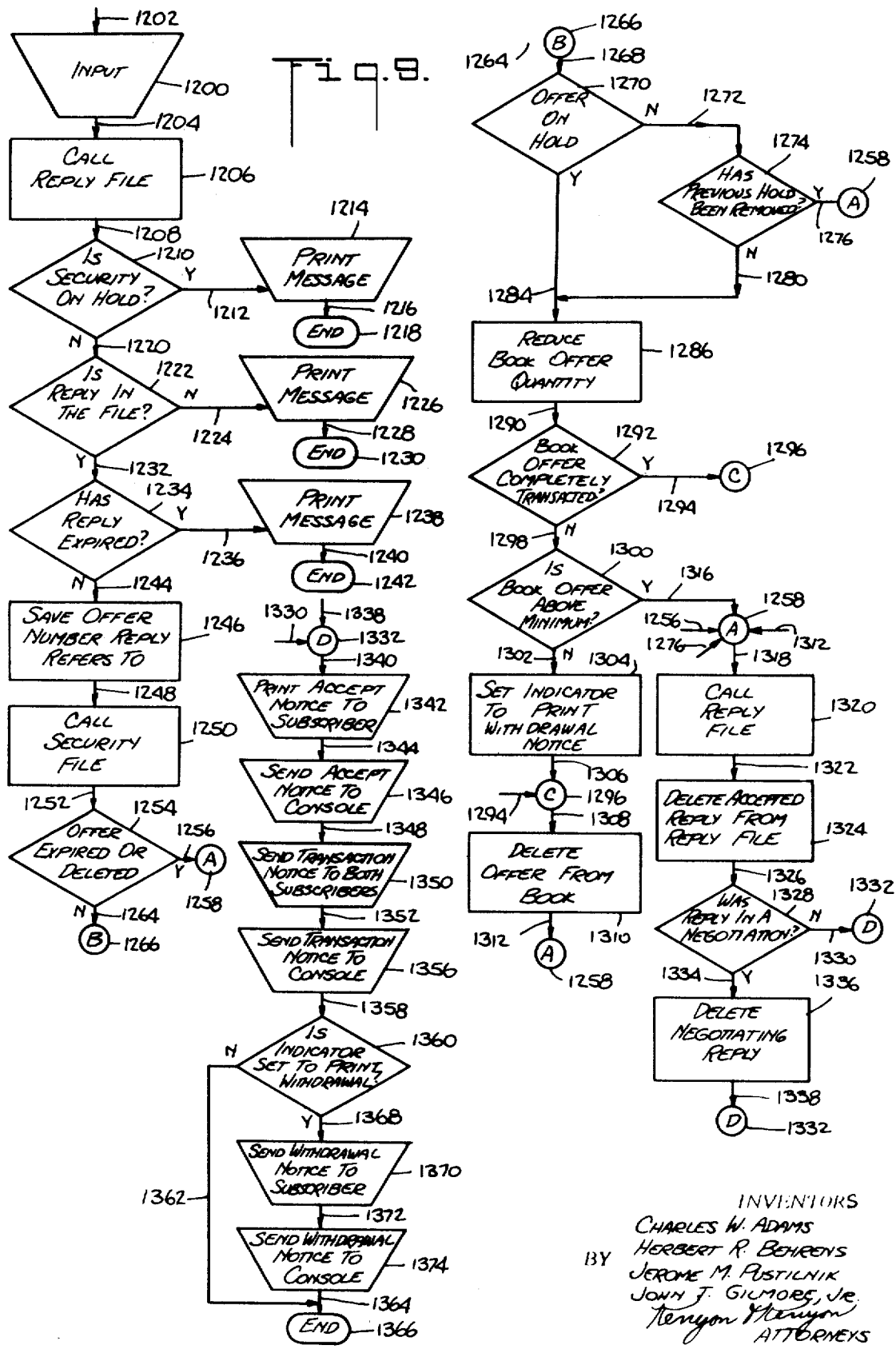

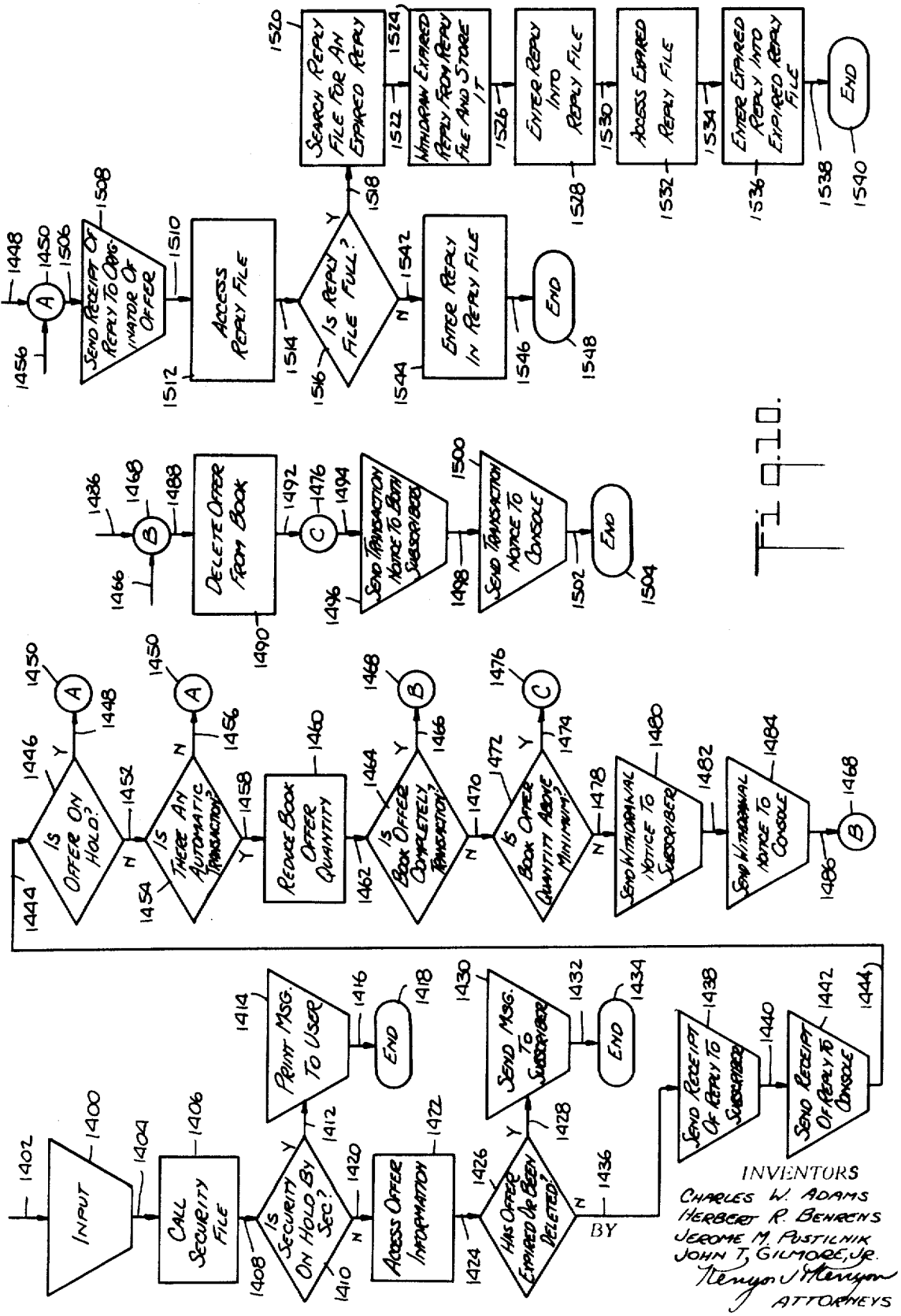

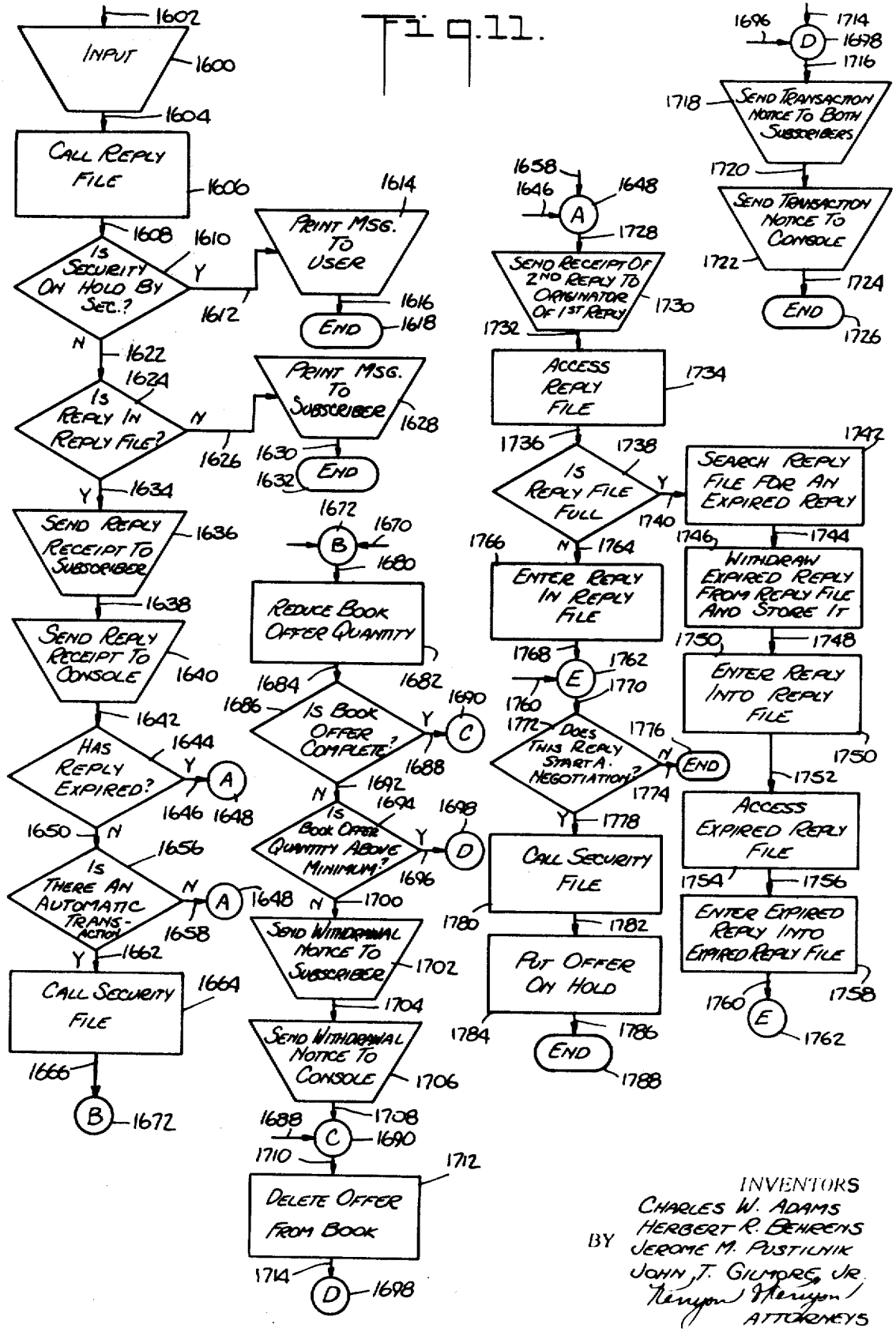

//3,573,747

INSTINET COMMUNICATION SYSTEM FOR EFFECTUATING THE SALE OR EXCHANGE OF FUNGIBLE PROPERTIES BETWEEN SUBSCRIBERS

BACKGROUND OF THE INVENTION

This invention relates to communication systems wherein it is desired to effectuate a trading of fungible properties. More particularly, this invention relates to a computerized communication system wherein the trading of fungible properties is effectuated automatically, anonymously and equitably among the participants in the trading.

Before the advent of this invention there was no known computerized communication system which could effectuate automatic trading in fungible properties while preserving anonymity and equitability among traders. The area of the securities market places and the institutional investors, an area which was particularly important to the inventors of the present system, required a new device which would enable these institutional investors to communicate information directly with one another so that they could, where they were interested in buying and selling a specific security, deal directly with each other without going through an intermediary. This area, as well as market places wherein other fungible properties are traded, further required a device which would provide the institutional investors and other traders anonymity and confidentiality when they communicated with each other and, further more, a device which would ensure that all of said institutional investors or said traders who used the device could receive information simultaneously so that all would be treated equally by the device. It is with this background of the state of the art that the inventors, being familiar with real time data processing capabilities, invented the present invention.

It is to be noted that although the disclosure herein below is directed to an application of the present invention wherein fungible properties to be traded are securities and the subscribers are institutional investors, the scope of this invention is not so limited. This invention may be applied to a variety of fungible properties and the subscribers may be any buyers and sellers desiring to trade any said fungible properties.

SUMMARY OF INVENTION

With this background of the invention in mind, it is an object of this invention to provide an apparatus and method of automatically, anonymously and equitably buying and selling fungible properties between subscribers.

It is a further object of this invention to provide a communication system wherein the trading of fungible properties can be effectuated without the necessity of a human negotiator between buyers and sellers.

It is a still further object of this invention to provide a communication system wherein buyers and sellers using said system can receive simultaneously information pertaining to a negotiation between said buyers and sellers.

It is a still further object of this invention to provide a computerized communication system wherein buyers and sellers using said system can be assured that no one buyer or seller will possess an advantage in the negotiations for the buying and selling of the fungible properties.

It is a still further object of this invention to provide a communication system wherein buyers and sellers using said system can be assured of confidential treatment in their negotiations.

These objects and others are accomplished by this invention and a particular embodiment of this invention is described hereinbelow. In this embodiment, a communication system is provided in which institutional investors communicate automatically, anonymously and equitably with each other for the purpose of trading securities. The communication system comprises a data processing subsystem including a plurality of tape memory units, an online storage unit and a computer or arithmetic unit. The communication system further comprises a plurality of subscriber installations, each including a keyboard/transmitting unit designed to transmit input data to the computer via telephone lines and a plurality of printer/receiving units designed to receive output data from the computer. The communication system further comprises a plurality of printer/receiving units located at a central location designed to monitor the system and a printer/receiving unit located at a bank designed to provide an automatic banking function in connection with the system.

The computer which is comprised in said data processing subsystem includes a control unit for operating the various portions of the data processing subsystem in a prescribed sequence of operations called the program. The program is preferably of the stored variety in which the storage and memory units contain coded signals representing successive operations to be performed. These coded signals are stored at prescribed memory or storage addresses, and the control unit carries out the stored operations in a prescribed sequence determined by the program and by the data upon which the operations are to be performed. The program comprises a plurality of subprograms which carry out prescribed operations within the system to permit the subscribers to communicate with each other by using the subscriber installations and to arrange block trades of securities by use of the data processing subsystem.

To facilitate these trades a subprogram of the system maintains a "Book" of buy and sell offers relating to each of several thousand securities. In connection with this invention the term maintains a "Book" or "book" an offer refers to a listing of buy and sell offers for each security in the system which is located in the storage portion of the data processing subsystem. Said offers are entered into the appropriate Book as received but are keyed into a "Sequence Table" which orders the offers according to the amount of money per share offered to buy or sell. The Sequence Table is a separate, but related listing, from the Book. Both listings for a given security are updated upon a request for a print of a Book of that security. Said buy and sell offers originate from the subscribers via the subscriber installations and every subscriber has access to the Book on any security at any time.

A second subprogram of the system provides a "Broadcast" capability through which any offer which has been booked may be transmitted in bulletin form at the time of entry into the Book to every subscriber installation in the system. In connection with this invention the term, provides a "Broadcast" or "broadcasts" an offer, refers to the capability of the present invention by which any subscriber who wishes to make an offer to buy or sell a given security may make this fact known directly to all other subscribers. This affords a subscriber more coverage for his offer than merely placing the offer in the appropriate Book. In the latter case the subscriber's offer does not become known until and unless another subscriber requests a print of that Book. Any subscriber may book an offer only or may book and simultaneously broadcast an offer. Both the Book and the Broadcast programs are intended to locate subscribers who are interested in opposite sides of a trade. Other subprograms of the system go much farther; they put the subscribers in direct contact with each other without delay and without loss of anonymity.

The first subprogram in accomplishing this permits an interested subscriber to respond to an open offer he has received from the system, whether in immediate response to a Broadcast or in delayed response to an entry in a Book which the subscriber has requested to be printed at a time subsequent to the booking of the entry in question. In a preferred embodiment of this invention, a Book entry may be withdrawn by the subscriber from whom it originated at any time and all entries are automatically expired by the system after seven calendar days from their entry. The response is sent via the responding subscriber's installation to the computer where it is entered into the Book corresponding to the offer and it is relayed to the originator of said offer.

Another subprogram of the system allows the originator of the offer, upon receipt of the response, to enter into an exchange of bids, offers and other negotiating messages. Such an exchange between two subscribers concerning a single security is called a "Colloquy". In a Colloquy the initiative passes automatically from one subscriber to the other, with the system keeping track of the negotiations and assuring that both subscribers are continuously aware of the status of the negotiation. As is true with every subprogram within the system, every message is fully documented by being produced simultaneously on the printer/receiving unit of both subscribers and absolute anonymity is maintained.

One subscriber may find himself faced with two or more subscribers responding to a single offer, or he may become involved in two or more separate Colloquies at the same time. A further subprogram of the system allows said subscriber to engage concurrently in two or more Colloquies while the subscribers on the other side are totally unaware of this.

A "Transaction" is effected as between the subscribers participating in a Colloquy if the price and number of shares bid or offered by one subscriber is acceptable to another. The computer sends a transaction notice to the subscriber installation printers of the subscribers involved in the agreed Transaction and to the system console printers. Said transaction notice contains full details of the agreement.

BRIEF DESCRIPTION OF THE DRAWINGS

The foregoing features of this invention, as well as the invention itself, may be more fully understood from the following detailed description read together with the accompanying drawing, in which:

FIG. 3 is a schematic block diagram of a flow chart illustrating a sequence of control by the data processing subsystem of this invention to accomplish the system function Book Print.

FIG. 4 is a schematic block diagram of a flow chart illustrating a sequence of control by the data processing subsystem of this invention to accomplish the system function Action Verify.

FIG. 6 is a schematic block diagram of a flow chart illustrating a sequence of control by the data processing subsystem of this invention to accomplish the system function Offer Withdrawal.

FIG. 7 is a schematic block diagram of a flow chart illustrating a sequence of control by the data processing subsystem of this invention to accomplish the system function Offer Revision.

FIG. 8 is a schematic block diagram of a flow chart illustrating a sequence of control by the data processing subsystem of this invention to accomplish the system function Accept Offer.

FIG. 9 is a schematic block diagram of a flow chart illustrating a sequence of control by the data processing subsystem of this invention to accomplish the system function Accept Reply.

FIG. 10 is a schematic block diagram of a flow chart illustrating a sequence of control by the data processing subsystem of this invention to accomplish the system function Reply to Offer.

FIG. 11 is a schematic block diagram of a flow chart illustrating a sequence of control by the data processing subsystem of this invention to accomplish the system function Reply to Reply.

In the drawing, corresponding parts are referenced throughout by the same numeral.

DESCRIPTION OF THE PREFERRED EMBODIMENTS

Figure 1:
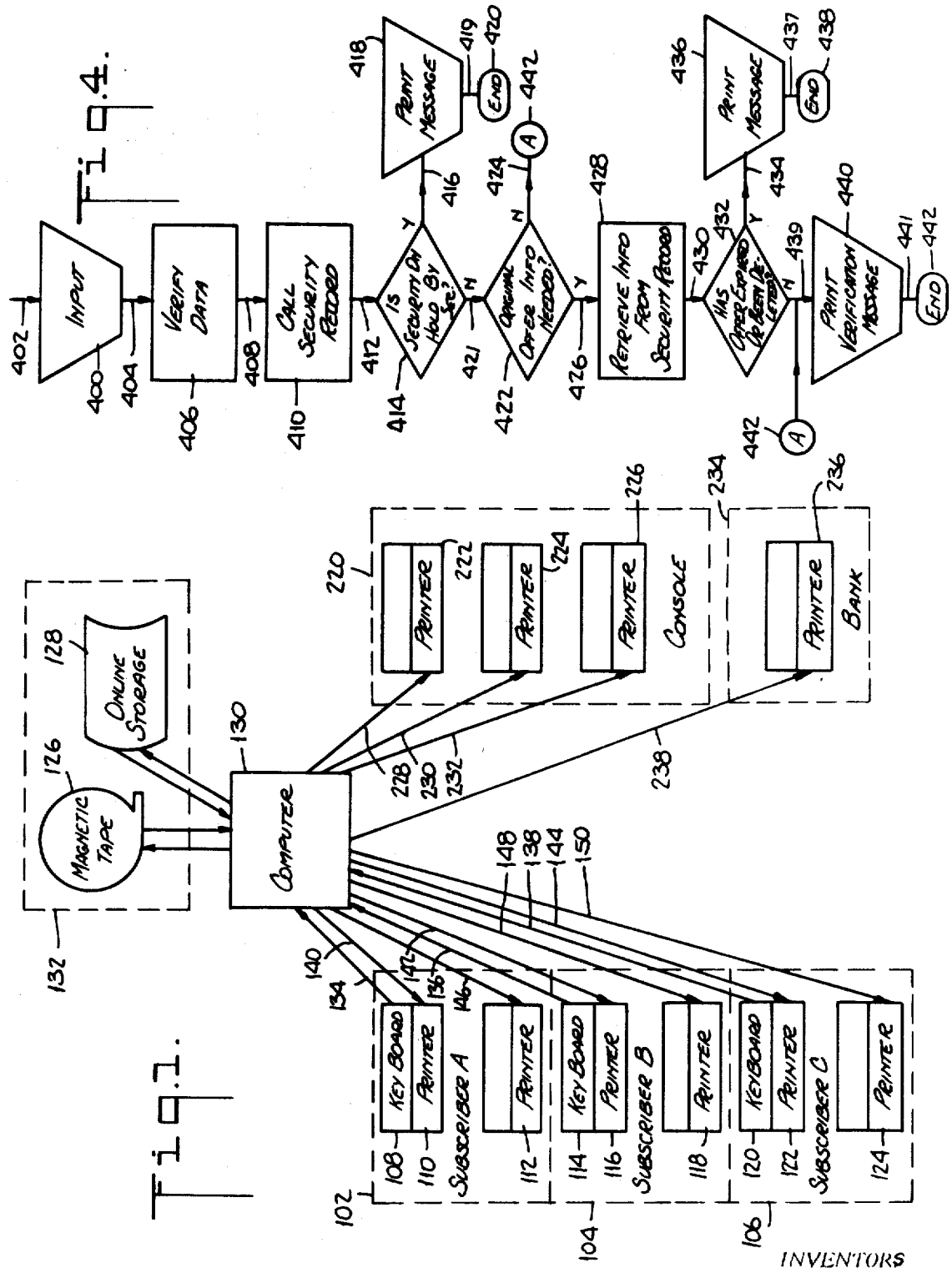
FIG. 1 is a schematic block diagram of the present invention illustrating the communication between subscriber installations A, B and C; the computer; the memory and storage means; and the console printers.

Referring to FIG. 1, the present invention is shown as comprising three subscriber installations 102, 104 and 106. Subscriber installation 102 is installed in a convenient place for use by a subscriber A, for example on the business premises of subscriber A. Subscriber installation 104 is likewise installed for use by a subscriber B and subscriber installation 106 for use by a subscriber C.

Subscriber installation 102 comprises a keyboard/transmitting unit 108, a printer/receiving unit 110 and a printer/receiving unit 112. Subscriber installation 104 comprises a keyboard/transmitting unit 114, a printer/receiving unit 116 and a printer/receiving unit 118. Subscriber installation 106 comprises a keyboard/transmitting unit 120, a printer/receiving unit 122 and a printer/receiving unit 124. In a preferred form of the invention the keyboard/transmitting unit 108 and the printer/receiving unit 110 are mounted in the same frame. The same is true with keyboard/transmitting unit 114 and printer/receiving unit 116 as well as keyboard/transmitting unit 120 and printer/receiving unit 122.

The present invention, as illustrated in FIG. 1, further comprises a data processing subsystem. The data processing subsystem, illustrated in FIG. 1, comprises a tape memory unit 126, an online storage unit 128 and a computer 130. The tape memory unit 126 and the online storage unit 128 together comprise the data storage unit 132 of the data processing subsystem. All the data concerning the securities comprised in the system are stored in the data storage unit 132 for manipulation by the computer 130. Furthermore, the computer 130 comprises a control unit for operating the various portions of the data processing subsystem in a prescribed sequence of operations called the program. The data storage unit 132 contains coded signals which represent said successive operations. These coded signals are stored at prescribed positions within the data storage unit 132 and said positions are indexed by a reference address. The control unit comprised within computer 130 carries out certain operations in a sequence determined by the program and the data upon which the computer 130 is operating. The data processing subsystem comprising the tape memory unit 126, the online storage unit 128 and the computer 132 is comprised, for example, in actual operation, in the Univac model 494 manufactured by Minneapolis Honeywell used in conjunction with the standard peripheral equipment for the Univac 494. The Univac 494 is used with the standard Univac memory core having a capacity of 65K and having a memory speed of three-quarters of a micro second per 30-bit word and an operational speed of three-quarters of a micro second per operation. The standard peripherals used with the Univac 494 is a Fastrand II; Univac model No. 1782 and 432 storage drums; and a communication system. The communication system comprises a Honeywell DDP 516 as front end concentrators; a Univac CTMC and a voice grade communication between the Honeywell DDP 516 and the Univac CTMC. Signals from the Teletype Corporation units mentioned hereinabove go to the Honeywell DDP 516 then to the Univac CTMC and finally to the Univac 494.

The keyboard/transmitting units 108, 114 and 120 transmit information from subscribers A, B and C respectively to the computer 130 via telephone lines 134, 136 and 138 respectively. The printer/receiving units 110, 116 and 122 receive results and other data from the computer 130 via telephone lines 140, 142 and 144 respectively. The printer/receiving units 112, 118 and 124 are used solely for the reception of Broadcasts via telephone wires 146, 148 and 150 respectively.

The keyboard/transmitting units 108, 114 and 120 can be teletype transmitting devices which are well known in the art but which have been specially modified for use in this invention. In the preferred form of the invention in actual use, the keyboard/transmitting unit 108 and the printer/receiving unit 110 mounted in the same frame is Model 28KSR manufactured by the Teletype Corporation. Model 28KSR is a keyboard send-receive unit which is fully duplexed and has a capacity of 10 characters per second. The same is true with keyboard/transmitting unit 114 and printer/receiving unit 116 as well as keyboard/transmitting unit 120 and printer/receiving unit 122. The only modification to the Model 28KSR unit for use in this invention has been in the keyboard of said unit. Furthermore in actual use, the printer/receiving units 112, 118 and 124 is a Model 28RO manufactured by the Teletype Corporation which has a capacity of 10 characters per second. 208, 210, 212, 214, 216, 218. In the lower right corner of the key tops appear the letters of the alphabet. In addition to these letters, there also appears a function to which that key corresponds. Most of the keys can be operated in one of at least two shifts. The FIGURES key 198 will put the keyboard in a first shift position and the LETTERS key 196 will put the keyboard in the other shift position. The keyboard is always in the FIGURES shift at the beginning of a message. Most of the keys 152—218 can be divided into five main groups.

The first such group of keys is used at the beginning of messages which are to be transmitted by a subscriber to tell the system of this invention what type of message to expect and what to do with the message. These keys comprise the keys 158 in the ACCEPT shift, 184 in the REPLY shift, 160 in the REVISE shift, 178 in the WITHDRAW shift, 182 in the BROADCAST shift, 180 in the REMOVE HOLD shift, 162 in the LIMITED BROADCAST shift, and 164 in the BOOK shift. The message commands corresponding to these eight keys refer to offers and replies relating to a specific security and thus must immediately be followed by the security number, each security having a uniquely assigned number, when transmitting a message.

The next group of keys is used to specify the terms of an offer or a reply. These keys comprise the keys 174 in the UP TO shift, 176 in the GOOD UNTIL shift, 172 in the BUY shift, 192 in the SELL shift, 194 in the UNPUB LIMIT shift, and 214 in the PRICE shift. Keys 172 in the BUY shift, 192 in the SELL shift, 174 in the UP TO shift and 194 in the UNPUB LIMIT shift are followed by quantities. Key 214 in the PRICE shift is followed by dollars and cents. Key 176 in the GOOD UNTIL shift is followed by time. These keys are very flexible in that they may be repeated in the same message in order to correct an error.

THe next group of keys is used at the end of a message. These keys comprise the keys 186 in the SIGN ON OR OFF shift, 208 in the CANCEL shift, 210 in the ENTER shift, 212 in the VERIFY shift and 218 in the ACTION shift. The key 218 in the ACTION shift precedes all other keys in this group, as well as key 206 in the PRINT shift, when the end of the message is reached and no further input will be accepted by the computer 130 (in FIG. 1) in this message. The key 194 in the RESET shift is used in situations where the subscriber is unsure of what has been keyed and wishes to return to a neutral state to begin the message anew. It is also used if a completed message is rejected by the system of this invention because of incomplete data or because of errors in keying. When the system rejects a message for any reason, the keyboard locks and a message code is printed on the output of printer/receiving unit 110, 116 or 122. The keyboard must then be unlocked by the subscriber before the message can be corrected. This is done with the key 154 in the UNLOCK KEYBOARD shift and the keys 218 in the ACTION shift and 194 in the RESET shift are then keyed to clear the message which is in error. The key 186 in the SIGN ON OR OFF shift is used whenever the subscriber installation 102, 104 or 106 is to be unused for an extended period of time or when a different individual becomes the operator of the subscriber installation. The subscriber installations 102, 104 and 106 are designed for unattended operation and need never be turned off in the usual sense. However, if a subscriber has any offers in the Book and will not be present to respond to another subscriber who is replying to these offers, said first subscriber will normally wish to sign off. Messages, such as replies to an offer, directed to a subscriber which has thus signed off are still received at his subscriber installation. The key 212 in the VERIFY shift instructs the system to print on the printer/receiving unit 110, 116 or 122 of a subscriber keying a message the information keyed in said message. This enables a subscriber to verify the accuracy of the information in his message before it is entered by the computer 130. Key 210 in the ENTER shift is used to transmit the message, Key 208 in the CANCEL shift is used to cancel the message. Key 206 in the PRINT shift is used to initiate the printing of a security Book.

The next set of keys pertains to predefined messages which are permanently stored and referenced by a message number. Key 200 in the SERVICE shift refers to those messages which are directed from a subscriber directly to the system and from the system to a subscriber. Key 202 in the INSTIGRAM shift relates to conversational replies which are sent from one subscriber to a subscriber who has originated a particular offer and reply.

The final set of keys comprises the keys 166 in the 7 shift, 168 in the 8 shift, 170 in the 9 shift, 186 in the 4 shift, 188 in the 5 shift, 190 in the 6 shift, 204 in the THOUSAND shift, 206 in the 0 shift, 208 in the 1 shift, 210 in the 2 shift and 212 in the 3 shift. These keys provide for the numerical digits 0—9 plus one labeled THOUSAND. The latter key is used to simplify the keying of quantities, i.e., 10,000 shares is keyed 10 THOUSAND and would comprise the keys 208 in the 1 shift, 206 in the 0 shift and 204 in the THOUSAND shift.

Referring again to FIG. 1 of the drawing, the system of this invention maintains three primary files or listings of data in the data storage unit 132. The first such file is the subscriber file which contains one record for each subscriber in the system. Each record holds identifying information concerning the subscriber which is used and available only for internal use to the system. Furthermore, security passwords corresponding to each subscriber are also stored in the subscriber file and are accessible by the system and authorized persons at the subscriber installation location.

Another file which is kept in the data storage unit 132 of the data processing subsystem is the Security file. This file contains all the information for buy offers, sell offers and replies for each security in the system. The Security file comprises a Book file which contains the buy and sell offers and a Reply file which contains the replies. According to a preferred embodiment of the invention, each Book for a given security has a maximum capacity for 29 buys, 29 sells. Each Reply file for a given security has a maximum capacity for 58 active replies. Further according to this preferred embodiment, each offer to buy or sell expires seven calendar days after it is entered into the Book unless an expiration time is specified by the subscriber who originated the offer. Any such expiration date which is specified by the subscriber who originated an offer may not exceed the seven day limit.

Buy offers are entered into the Book in the order which they are received. However, a sequence table is maintained in conjunction with a Book and the buy offers are sequenced in descending order by price. Furthermore, by use of a sequence table in conjunction with the Books, sell offers are sequenced by ascending order by price. The data processing subsystem is adapted so that in the event of two buy offers or two sell offers of duplicate prices the time entered determines the priority in the Book. The Book file for a given security is resequenced when further offers are booked or if an existing offer is revised, withdrawn or transacted (i.e., a completed agreement). In a preferred embodiment of the invention, a subscriber is not allowed to have more than 10 buy offers and 10 sell offers in a given Book at any one time. If an offer to buy or an offer to sell in a Book becomes sequenced in the associated sequence tables so that it occupies the 13 entry in that sequence table (i.e., it has the lowest priority in the Book), it will be dropped from the Book and a notice sent to the subscriber who originated the offer to inform him of the automatic withdrawal of the offer by the system. In the preferred embodiment of this invention there is a maximum of 58 active replies per security in any 15 minute period. All replies expire 15 minutes after they are entered.

Another file which is maintained by the data storage unit 132 of the data processing subsystem is a file for expired replies. When expired replies are removed from the Book they are stored in the expired reply file. Expired replies are accessible for the remainder of the day to the subscribers even though they are not binding on the subscriber who originated the reply.

According to the preceding description of the present invention there are a plurality of functions which are carried out by the data processing subsystem to facilitate the prime function of this invention which is to arrange for block trades of securities between subscribers while maintaining complete anonymity and security. The first of said functions is the Book or the Book and Broadcast. Buy or sell offers are entered from a keyboard/transmitting unit, such as keyboard/transmitting unit 108 of subscriber installation 102, into a Book corresponding to the security being offered. Said Book is maintained by the data storage unit 132 in the data processing subsystem. A check is made within the data processing subsystem to see if the offer can be filled by an existing offer or offers on the other side of that Book. For example, if an offer to sell 1,000 shares of X Corporation stock is entered into the Book maintained for that security, a check will be made to see if there are any offers to buy shares of X Corporation in the Book for that security which can be used to fulfill the offer to sell. To the extent that such buy offers are available, a transaction will automatically be effected by the data processing subsystem and a notice will be sent to the printer/receiving units of the subscribers involved. For example, a notice will be sent to the subscriber who booked the sell offer of 1,000 shares of X Corporation stock and to the subscribers whose buy offers of shares of X Corporation were used to satisfy the sell offer in part or in whole. If an offer is not thus automatically transacted or it is only partially transacted, it is filed in the Book for that security according to the priority system hereinabove mentioned, If the offer is to be booked only, a message output from the computer 130 will be sent to the subscriber installation of the subscriber who booked the offer. However, if the offer is to be booked and broadcast, a message output from the computer 130 will be received via telephone lines 146, 148 and 150 by broadcast printer/receiving units 112, 118 and 124 of all the subscribers shown in FIG. 1.

Figure 5A:
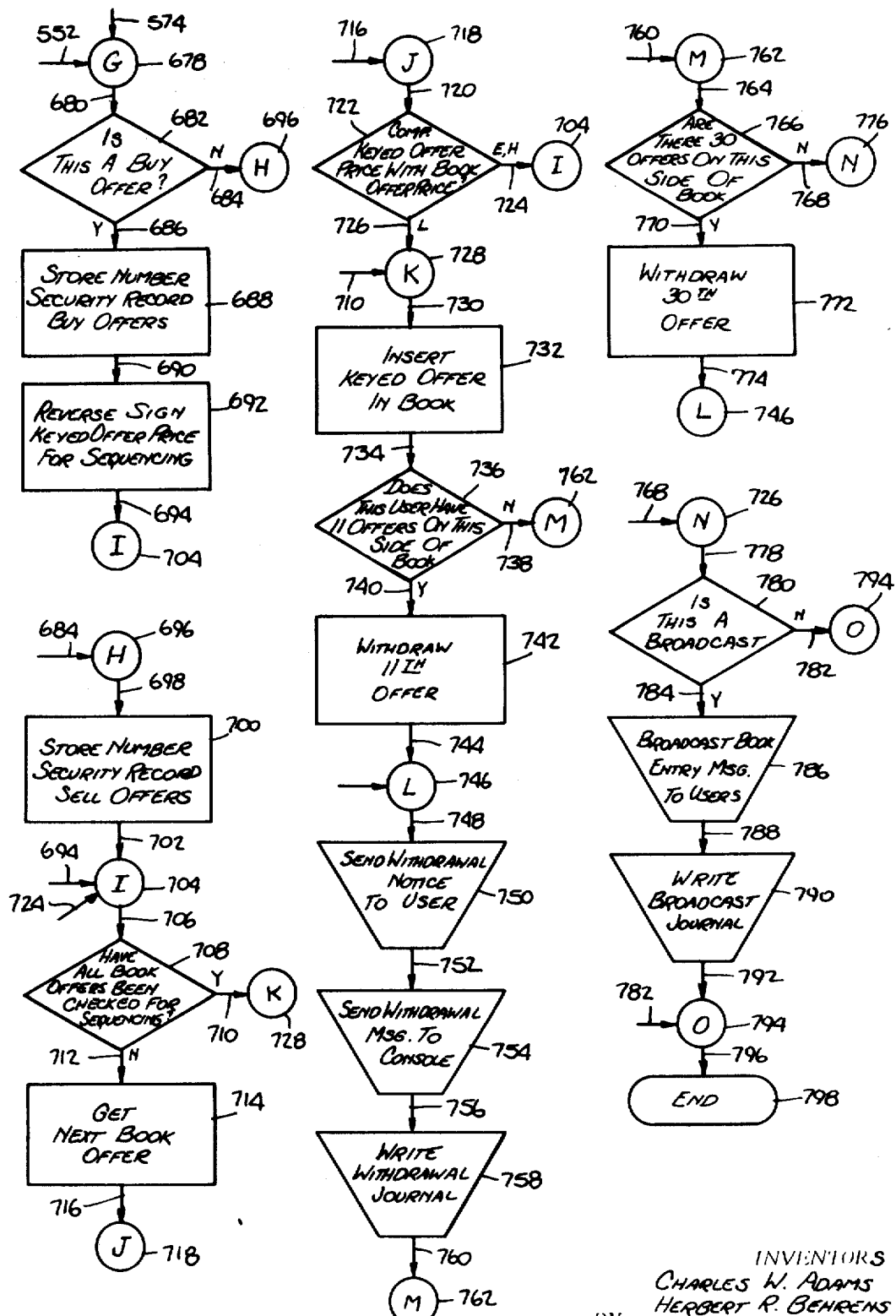
FIG. 5 is a schematic block diagram of a flow chart illustrating a sequence of control by the data processing subsystem of this invention to accomplish the system function Book and/or Broadcast.

As will be noted from FIG. 1 and from the flow charts (see in particular FIG. 5A), the broadcast mode is tied into the rest of the system in such a fashion that the offer being broadcast is also booked. However, in order to reduce queing problems, it is preferable that the broadcast operation operate over lines, or other transmission links, that are separate from and essentially independent of the transmission links or lines which are employed for the rest of the operation of the system. Thus the normal transmission of offers and replies and the reading out of the book take place over one transmission system and the broadcast of offers takes place over a second transmission system.

One important reason for keeping the equipment of the broadcast mode separate from the equipment for the rest of the operation of the system is to avoid distorting priority. For example, if with reference to FIG. 1, subscriber A has sent out an offer in which there is a great deal of activity, he may receive a fairly large number of replies on his main printer/receiving unit 110 at one time. If his main printer/receiver unit 110 is actively receiving these replies and at the time it is so doing another subscriber broadcasts an offer, whether it be in the same security or not, that broadcast offer will be received on the broadcast printer/receiver unit 112. However, if the broadcast printer/receiver unit 112 was not employed as a separate unit with separate transmission links to the rest of the subscribers, then this broadcast offer would have to take its place in line at the main printer/receiver 110. As a consequence the broadcast offer might be printed out to the subscriber A somewhat later than to other less-active subscribers. In order to provide equitable treatment of all subscribers, the broadcast mode of operation is thus made independent of the activity of the main printer/receiver by virtue of having the broadcast channel separate from the communication channels employed for the rest of the operation of the system.

Figure 2:
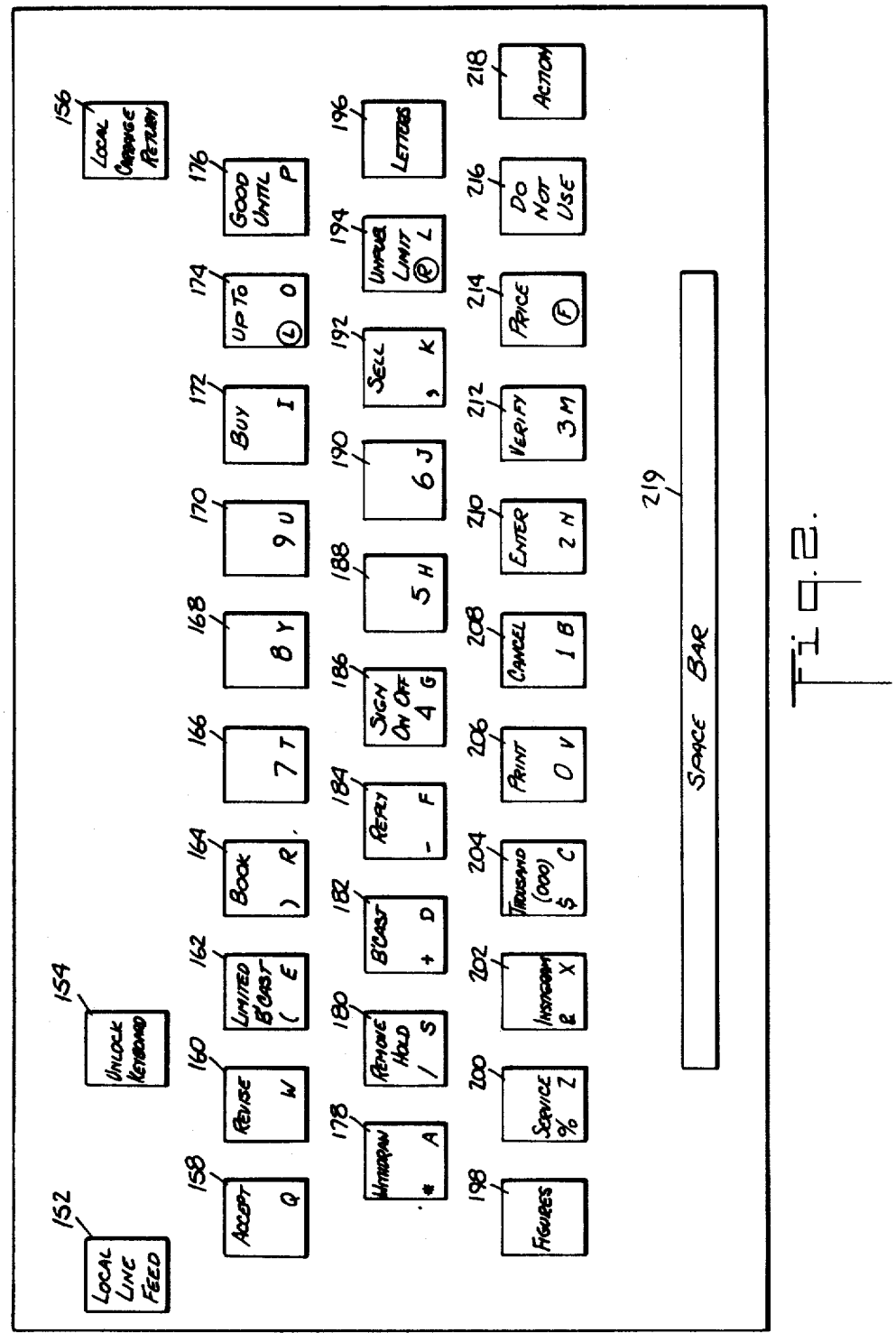
FIG. 2 is a diagram illustrating a typical keyboard utilized for information input to the system of the present invention.

By way of example, assume that subscriber A wishes to Book & Broadcast a sell offer of X Corporation shares. Assume further, that X Corporation has a security code designation of 175. Assume that subscriber A wishes to sell from 10,000 to 20,000 shares of X Corporation shares at 26½. Referring to FIG. 2, subscriber A would initiate this offer into the Book for X Corporation stock by striking key 182 in the Broadcast shift. Subscriber A next strikes keys 208 in the 1 shift, 166 in the 7 shift and 188 in the 5 shift, thus keying the security code for the X Corporation. Next subscriber A strikes key 192 on the SELL shift thus indicating the action required. Next subscriber A strikes keys 208 in the 1 shift, 206 in the 0 shift, 204 in the THOUSAND shift, 174 in the UP TO shift, 210 in the 2 shift and 206 in the 0 shift then 204 in the THOUSAND shift, thus keying in the lower and upper limits of the quantity subscriber A wishes to sell. Next subscriber A strikes keys 214 in the PRICE shift, 210 in the 2 shift, 190 in the 6 shift, 188 in the 5 shift and 206 in the 0 shift, thus keying in the price at which he is willing to sell. At this point the message is complete insofar as subscriber A is aware. However, as a check subscriber A next strikes key 218 in the ACTION shift and key 212 in the VERIFY shift thus producing a print on the printer/receiving unit 110 of the message as keyed by subscriber A on the keyboard/transmitting unit 108. If the verification print shows all information correctly, the offer is entered into the Book for X Corporation by subscriber A by striking key 218 in the ACTION shift and key 210 in the ENTER shift. If any information needs to be changed, any or all of the above steps may be repeated. Suppose, for example, the price was keyed incorrectly and 26,650 printed instead of 2,650 as the price. Subscriber A would then correct the error by striking keys 214 in the PRICE shift, 210 in the 2 shift, 190 in the 6 shift, 188 in the 5 shift, 206 in the 0 shift, 218 in the ACTION shift and finally 212 in the VERIFY shift to verify that the corrected information is indeed correct. If the message is to be entirely cancelled, subscriber A will strike key 218 in the ACTION shift and key 208 in the CANCEL shift.

The offer in the above example is called a bona fide offer since it specified the price and quantity of the security at which the offer is made. The price or quantity could have been omitted from the above offer and it would then be interpreted as merely a request for buyers.

A further function carried out by the data processing subsystem is that of Revision. An offer may be revised by its originator any time before it either expires, is accepted or is executed. The only data of a booked offer which can be changed is Price. The revised offer is resequenced in the Book whenever a revision affects its priority. If the original offer was broadcast, any revision to that offer will also be broadcast. Likewise, if the original offer was booked the revision will not be broadcast. By way of example, assume that subscriber A has booked and broadcast a sell offer of 10,000 to 20,000 shares of X Corporation stock at 26 ½. Assume further that subscriber A now wishes to change the terms of this offer to sell 10,000 to 20,000 shares of X Corporation stock at 25. Referring to FIG. 2, subscriber A would effectuate this revision in the Book for X Corporation stock by first striking key 160 in the REVISE shift. Subscriber A next strikes keys 208 in the 1 shift, 166 in the 7 shift and 188 in the 5 shift, thus keying the security code for the X Corporation. Next subscriber A strikes space bar 219. Assuming that the original sell offer was given the offer number 20,562 subscriber A next strikes keys 210 in the 2 shift, 206 in the 0 shift, 188 in the 5 shift, 190 in the 6 shift and 210 in the 2 shift, thus keying the offer code for the offer which subscriber A is now trying to revise. Now subscriber A is in a position to key his revisions into the Book for X Corporation. Next subscriber A strikes keys 214 in the PRICE shift, 210 in the 2 shift, 188 in the 5 shift, 206 in the 0 shift, and again 206 in the 0 shift, thus keying in the price at which subscriber A is now willing to sell his shares of X Corporation. At this point the message is complete insofar as subscriber A is aware. However, as mentioned hereinabove, subscriber A checks his message by striking keys 218 in the ACTION shift and 212 in the VERIFY shift thus producing a print on the printer/receiving unit 110 of the message as keyed by subscriber A on the keyboard/transmitting unit 108. If the verification print shows all information correctly, the message comprising the revision is entered into the Book for X Corporation by subscriber A by striking key 218 in the ACTION shift and key 210 in the ENTER shift.

A further function carried out by the data processing subsystem is that of Withdrawal. An offer may be withdrawn by its originator at any time. If the original offer was broadcast, the withdrawal of that offer is automatically broadcast. By way of example, assume that subscriber A wishes to withdraw his original offer to sell for 10,000 to 20,000 shares of X Corporation stock at 26 ½. Referring to FIG. 2, subscriber A would initiate his withdrawal by striking key 178 in the WITHDRAW shift. Subscriber A next strikes keys 208 in the 1 shift, 166 in the 7 shift and 188 in the 5 shift, thus keying the security code for the X Corporation. Next, subscriber A strikes the SPACE BAR 219, then keys 210 in the 2 shift, 206 in the 0 shift, 188 in the 5 shift, 190 in the 6 shift and 210 in the 2 shift, thus keying in the offer number assigned to the sell offer of subscriber A when it was first entered into the Book for X Corporation. The security code number and the offer number are separated by a space when they are keyed. Again subscriber A strikes key 218 in the ACTION shift and key 212 in the VERIFY shift to see if his message was keyed correctly and then strikes key 218 in the ACTION shift and 210 in the ENTER shift to enter the message if it was so keyed correctly.

A further function carried out by the data processing subsystem is that of printing a Book. A Book may be printed at a subscriber's installation 102, 104 or 106, listing the open offers to buy and sell that are listed in that Book. The total number of buys and sells and the average price weighted by quantity on each side of the Book will also be shown.

By way of example, assume that subscriber A before booking his original offer to sell X Corporation stock. Referring to FIG. 2, subscriber A would initiate the printing of open offers which are contained in the Book of X Corporation by striking keys 208 in the 1 shift, 166 in the 7 shift and 188 in the 5 shift, thus keying the security code of X Corporation. Next subscriber A strikes key 218 in the ACTION shift and 206 in the PRINT shift.

A further function carried out by the data processing subsystem is that of Replies. In general, a Reply is a direct communication to one or more subscribers. The subscribers involved are always completely anonymous to one another, since the system records internally the senders and receivers of all messages and classifies these senders and receivers by code numbers. A subscriber refers only to a reply number or an offer number printed on a message he receives and the system sends his reply to the originator of the message to which he is replying.

A reply is binding on the originator for a period of fifteen minutes after the time of entry of said reply. In a Colloquy only the most recent reply from each subscriber is considered valid. Previous replies in the same Colloquy are discarded. Valid replies which expire (exceed the 15 minute limit) are no longer binding on the originator but remain accessible for the rest of the day.

A direct reply to one subscriber always refers to a specific offer in the Book, or to another reply.

A reply to many offers simultaneously may be made by use of the key 162 in the LIMITED BROADCAST shift. This will allow a subscriber to respond to all of the offers of the top five subscribers in a given Book.

By way of further example, assume that a subscriber B wishes to Reply to the Book & Broadcast of subscriber A to sell from 10,000 to 20,000 shares of X Corporation at 26½. Assume as above that the offer by subscriber A has been given an offer number 20,562 and that subscriber B's reply to the offer of subscriber A is an offer to buy 15,000 shares of X Corporation at 25½. Referring to FIG. 2, subscriber B would initiate his reply (i.e., an offer to buy X Corporation stock) by striking key 184 in the REPLY shift. Subscriber B next strikes keys 208 in the 1 shift, 166 in the 7 shift, and 188 in the 5 shift, thus keying the security code for the X Corporation. Next subscriber B strikes the space bar 219 and then keys 210 in the 2 shift, 206 in the 0 shift, 188 in the 5 shift, 190 in the 6 shift and 210 in the 2 shift, thus keying in the code number given to the original offer of subscriber A to which this Reply is directed. Next subscriber A strikes key 172 in the BUY shift thus indicating that his reply is an offer to buy securities of X Corporation and is in response to an offer of subscriber A to sell said securities. Subscriber B next strikes keys 208 in the 1 shift 188 in the 5 shift, and 204 in the THOUSAND shift, thus indicating the number of shares of X Corporation stock that subscriber B is offering to buy. Subscriber B next strikes key 214 in the PRICE shift and then keys 210 in the 2 shift, 188 in the 5 shift, 188 in the 5 shift again and 206 in the 0 shift, thus keying in the price at which subscriber B is willing to buy 15,000 shares of X Corporation. As above, subscriber B will strike the appropriate keys to have a verification print of his message and he will ENTER that message if the information is shown to be correct. Subscriber A will immediately receive the above information on his printer/receiving unit 110 and this reply will bear a number assigned to it. If subscriber A wishes to continue the negotiation with subscriber B, he will key a message similar to the reply above from subscriber B, using the reply number on the latest response as the reference number for the new response.

When the originator of an offer enters into a negotiation with another subscriber, the preferred embodiment of this invention protects that offer by placing it in a hold status. This ensures that the original offer can not be transacted by a third subscriber during the negotiation between the original two subscribers. The originator of the original offer may remove the hold immediately if he wishes the offer to remain active throughout his negotiations. If the negotiations result in a closing (i.e., some part or all of the original offer has been accepted by a reply or a subsequent reply by one of the subscribers has been accepted in part or totally by the other subscriber) the offer is altered in one of two ways. If the quantity bought or sold is equal to the quantity of the original offer, the offer is removed from the books. If the quantity transacted is less than the quantity of the original offer, the offer is kept in the book and adjusted to reflect the remaining quantity.

If the negotiation does not reach a closing, the originator of the offer must remove the hold to reestablish his offer as an open buy or sell on the Book of X Corporation. For example, if subscriber A in negotiating with subscriber B fails to reach a closing, he would reestablish his original offer as an open sell offer by first striking key 180 in the REMOVE HOLD shift. Subscriber A next strikes keys 208 in the 1 shift, 166 in the 7 shift, and 188 in the 5 shift, thus keying the security code for the X Corporation. Subscriber A next strikes the space bar 219 and keys 210 in the 2 shift, 206 in the 0 shift, 188 in the 5 shift, 190 in the 6 shift and 210 in the 2 shift, thus keying in the code number given to the original offer of subscriber A at the time it was entered into the Book of X Corporation. Finally, subscriber A would verify his message as above described and if correct would enter the message.

A further function carried out by the data processing subsystem is that of Closings. A Closing is a result of an agreement between two subscribers. It can be performed automatically by the system or initiated by a subscriber who accepts the terms of an offer or reply of another subscriber. In either instance, the transaction notice is printed on the printer/receiving units 110, 116 or 122 of both subscribers involved. An automatic closing is accomplished by the system in three different ways. The first way an automatic Closing is accomplished is when an offer is entered on one side of a Book as against an offer listed on the other side of that Book and falls within the prescribed limits of quantity and price associated with each other. A second way in which an automatic closing is accomplished is when a reply is made to an existing offer. A third way in which an automatic closing is accomplished is when a reply is made to an existing reply.

When an offer is entered into the Book, the system attempts to fulfill all or part of it with one or more open offers on the other side of the Book. The offer with a price equal to or better than the new entry is given first consideration. If the quantity fills the terms of the offer being booked, a closing is performed, If the quantity is inadequate or only partially completes the offer, the system attempts to perform a closing with the offer of second priority. In the case of duplicate prices, the offer with the earliest time has first priority. These steps are repeated by the system until the terms of the new offer are satisfied or it is found that the offer cannot be fulfilled with any of the existing offers on the other side of the Book. Any unfulfilled offers are entered into the Book; a partially filled offer is entered with the remaining quantity. An offer that is entered without a price or quantity is never automatically transacted. It is considered an expression of interest only and not a bona fide offer. A closing is attempted by the system whenever the price of an offer is revised by its originator.

When a reply is made to a specific offer, only that offer is used to see if a closing can be performed. Likewise, if a reply is sent to several offers at once (limited broadcast), each offer has the opportunity to be automatically executed.

On a reply to reply basis, only two replies (the message being keyed and the message to which it is responding) are involved in the attempt at a closing.

Whenever a closing is automatically effected, two or more offers or replies are involved. The originator of the first offer or reply entered has the advantage of possibly consummating a trade at a better price than exists in his offer or reply. For example, if subscriber A has a sell offer in the Book for X Corporation for 10,000 shares at $26.50 and subscriber B books a buy offer for the same quantity of X Corporation stock at $27.00, the system automatically closes the trade at $27.00. Conversely, if subscriber A enters his offer after subscriber B, the closing price is $26.50.

By way of example, assume that subscriber A's most recent reply in a Colloquy with subscriber B is an offer to sell 15,000 shares of X Corporation at $26.00 and assume further that the system has given this reply the reply reference number 8,967. Referring to FIG. 2, subscriber B could accept subscriber A's reply by first striking key 158 in the ACCEPT shift. Subscriber B next strikes key 208 in the 1 shift, 166 in the 7 shift, and 188 in the 5 shift, thus keying the security code for X Corporation. NExt subscriber B strikes the space bar 219 and then keys 168 in the 8 shift, 170 in the 9 shift, 190 in the 6 shift, and 166 in the 7 shift, thus keying the reference number of the reply by subscriber A which subscriber B is accepting. Before transmitting his acceptance message, subscriber B will strike key 218 in the ACTION shift and key 212 in the VERIFY shift and the current terms of the offer being accepted is printed on printer/receiving unit 116. Subscriber B may then strike key 218 in the ACTION shift and 210 in the ENTER shift which will cause a formal record followed by a transaction notice to be produced on the printer/receiving unit 116 of subscriber B and a transaction notice to be produced on the printer/receiving unit 110 of subscriber A. However, if the terms of the offer of subscriber A have changed in the interim between subscriber B's striking key 212 in the VERIFY shift and his striking key 210 in the ENTER shift, the transaction will not be performed by the system.

It is to be noted from the above description of the various functions performed by the preferred embodiment of this invention, that the system utilizes a plurality of distinct reference numbers in its operations. These reference numbers enable the system to achieve its goal of anonymity among the various subscribers as well as fairness in effectuating the various transactions. Offers from all subscribers are given offer reference numbers consecutively from 10,000—99,999. This number is permanently assigned to an offer until it is removed from the Book wherein said offer has been listed. Replies from all subscribers are assigned reply reference numbers from 1- —9,999. Each reply is given a new reference number and a subscriber replies to the reference number of the most recent response from another subscriber concerning the offer being negotiated. Every closing, whether automatic or subscriber initiated, causes a transaction notice to be printed on the terminals of both subscribers involved. These notices will carry a transaction reference number in the form of 2 to 7 digits. Furthermore, every offer, revision, or withdrawal that is Broadcast is assigned a sequential Broadcast reference number. In addition to these reference numbers the system also utilizes an authorized subscriber code which allows the system to identify an authorized user of the system. Finally, each subscriber installation maintains a station log number which is unique for each subscriber. Every message keyed by a given subscriber receives a sequentially assigned number which prints out with the message, as a slip number, but this number is not carried internally within the system and is used solely for that particular subscriber's reference.

Since the time at which a particular offer or reply is entered into the system may be of importance in the preferred form of this invention the date of entry will appear on all output messages. The date is shown as month/day/year. The time of day also appears on every message and is expressed in hours on a 24 hour basis using local New York City time. For example, 2:47 p.m. appears as 1447. Of course, there is no significant technical difficulty in using each subscriber's local time in another form of the present invention.

Referring again to FIg. 1, the preferred embodiment of the present invention has a console 220 at the system's central location. The console 220 comprises keyboard printer/receiving units 222, 224 and 226 which are used to monitor the system. The printer/receiving units 222, 224 and 226 receive the various messages flowing through the system via wires 228, 230 and 232 respectively. Among the messages which are monitored by the console 220 are all Broadcasts, a record of all closings containing detailed transaction information and identification of the buyer and seller involved in the transaction, system messages, subscriber Sign-on and Signoff and relayed replies or messages. In thus monitoring the system console 220 aids in maintaining the system's integrity.

Finally, the preferred embodiment of the present invention has a bank console 234 comprising a printer/receiving unit 236. The bank console 234 receives data from the computer 130 via line 238. This data comprises a summary of the transaction within the system for a given day and is sent via line 238 to the bank console 234 at the end of each day. This enables the banking institution, wherein said bank console 234 is located, to perform the necessary financial dealings associated with each transaction. A remote batch data processing facility is provided by the computer 130 which stores the data for each transaction and prepares an appropriate summary therefrom.

The preceding disclosure of the present invention has been directed to the functions which are carried out by the invention. The following disclosure of this invention describes the method and means which comprise the present invention and which carry out the functions heretofore described.

A logic flow chart illustrating the means and sequence of operation adapted by the data processing subsystem of the present invention for providing the Book Print function hereinabove described is shown in FIG. 3 of the drawings. In this flow chart the rhombus-shaped box represents a manual operation and will be referred to herein as a manual operation means. The rectangular-shaped box represents a process and shall be referred to as a process means. The diamond-shaped box represents a decision and shall be referred to as a decision means. The circle with a capital letter therein represents input and output access means. The oblong box represents a terminal and shall be referred to as a terminal. A particular branch route is taken from the diamond box when the decision associated with that route is such as to indicate that route.

The sequence of operations for the production of a Book Print which are performed within the data processing subsystem of the present invention is initiated when the message requesting a print is received by the computer 130. When such a message is received by the computer 130 an input is provided to the manual operation means 252 via branch route 254. The sequence then moves via branch 256 to process means 258. The process means 258 has access to the data storage unit 132. Since the security reference code number is an input to this sequence, the process means 258 locates within the data storage unit 132 the Book which corresponds to the security whose Book Print is being requested. Once the appropriate Book is accessed by the process means 258, the sequence moves via branch 260 to the decision means 262. The decision means 262 makes the decision whether the security whose Book Print is being requested is on HOLD by the SEC. If the decision is yes, the security is on HOLD by the SEC, the sequence is routed along branch route 264 to decision means 266. If, on the other hand, the decision is no, the security is not on HOLD by the SEC, the sequence is routed via branch route 268 to process means 270. Decision means 266 makes the decision whether the system is keying the security whose Book is being requested even though it is on HOLD by the SEC. If the decision is no, INSTINET is not keying the security, then the sequence is routed via branch h route 272 to the manual operation means 274. The manual operation means will print a notice notifying the subscriber who requested the Book Print that he will be unable to obtain it. If, on the other hand, the decision is yes, INSTINET is keying the security even though the security is on HOLD by the SEC, the sequence is routed via branch route 276 to the process means 270 via branch 268. The process means 270 will save the offer counters and sequence tables and prepare for the printing of the Book. The sequence is then routed via branch 278 to the manual operation means 280. The manual operation means 280 will print the heading for the Book Print indicating the name of the security and any other general information. The sequence is then routed via branch 282 to the decision means 284. Branch 282 is accessed by access point 283 which is referenced by the capital letter A. Decision means 284 makes the decision whether there are more offers in the Book which have yet to be printed. If the decision is that there are no more offers left in the Book to be printed, the process will be routed via branch 285 to manual operation means 286. Manual operation means 286 writes a magnetic tape entry to the magnetic storage means 126. The sequence is then routed via branch 287 to terminal 288. Terminal 288 represents the end of the Book Print sequence of operations. If the decision is yes, there are more offers in the Book yet to be printed, the sequence is routed via branch 290 to decision means 292. Branch 290 is accessed by access point 294 which is referenced by a capital B. Decision means 292 makes the decision whether there are any more buy offers in the Book yet to be printed. If the decision is no, there are no more buy offers in the Book yet to be printed, the sequence is routed via branch 296 to reference point C. Reference point C is described hereinbelow. If however, the decision is yes, there are more buy offers yet to be printed in the Book, the sequence is routed via branch 298 to process means 300. Process means 300 scans the Book to be printed and gets the information for the next buy offer to be printed. The sequence then is routed via branch 302 to decision means 304. Decision means 304 makes the decision whether the buy offer which has just been scanned by process means 300 has expired or has been deleted from the Book. If the decision is yes, the next buy offer to be printed has expired or has been deleted from the Book, the sequence is routed via branch 306 to reference point B which is access point 294. If, on the other hand, the decision is no, the next buy offer to be printed has not expired and has not been deleted the sequence is routed via branch 308 to decision means 310. Decision means 310 makes the decision whether the next buy offer to be printed has been placed on a HOLD status. If the decision is yes the next offer has been placed on a HOLD status, the sequence is routed via branch 312 to process means 314. Process means 314 sets a printing indicator to print an H next to a print out of that particular offer. The sequence is then routed via branch 316 to branch 318. If, on the other hand, the decision made by decision means 310 is that the offer to be printed is not in a HOLD status, the sequence will be routed via branch 318 to decision means 319. Decision means 319 makes the decision whether the offer being printed belongs to the subscriber requesting the Book Print. If the decision is yes, the offer being printed is the subscriber's offer, the sequence is routed via branch 320 to process means 321. Process means 321 sets a printing indicator to print a dash next to a printout of that particular offer. The sequence is then routed via branch 322 to branch 323. If, on the other hand, the decision made by decision means 319 is that the offer being printed is not the subscriber's, the sequence is routed via branch 323 to process means 324. Process means 324 updates the totals. The sequence is then routed via branch 325 to decision means 326. Branch 325 is accessed by access point 327 which bears the reference character C. Decision means 326 makes the decision whether there are more sell offers yet to be printed in the Book. If the decision is no, there are no more sell offers yet to be printed in the Book, the sequence is routed via branch 328 to access point E. Reference point E will be described hereinbelow. If, on the other hand, the decision is yes, there are more sell offers yet to be printed in the Book, the sequence is routed via branch 330 to process means 332. Process means 332 scans the Book and gets the information for the next sell offer which is to be printed. The sequence is then routed via branch 334 to decision means 336. Decision means 336 makes the decision whether the next sell offer to be printed has expired or has been deleted. If the decision is yes, the next sell offer to be printed has expired or has been deleted, the sequence is routed via branch 338 to reference point C which is access point 327. If, on the other hand, the decision is made that the next sell offer to be printed has not expired and has not been deleted, the sequence is routed via branch 340 to decision means 342. Decision means 342 makes the decision whether the next sell offer to be printed is in a HOLD status. If the decision is yes, the next sell offer to be printed is in a HOLD status, then the sequence is routed via branch 344 to process means 346. Process means 346 sets the printer to print an H next to a print out of that particular offer. The sequence is routed from process means 346 via branch 348 to branch 350. If, on the other hand, the decision is that the next sell offer to be printed is not in a HOLD status, then the sequence will be routed from decision means 342 via branch 350 to decision means 351. Decision means 351 makes the decision whether the offer being printed belongs to the subscriber requesting the Book Print. If the decision is yes, the offer being printed is the subscriber's offer, the sequence is routed via branch 352 to process means 353. Process means 353 sets a printing indicator to print a dash next to a print out of that particular offer. The sequence is then routed via branch 354 to branch 355. If, on the other hand, the decision made by decision means 351 is that the offer being printed is not the subscriber's, the sequence is routed via branch 355 to process means 356. Process means 356 will update the totals. The sequence is routed from process means 356 via branch 357 to manual operation means 358. Branch 357 is accessed by access point 259 which is denoted by reference designation E. Manual operation means 358 will print out a line of information corresponding to the buy or sell offer which has just been considered in the sequence. The sequence is routed from manual operation means 358 via branch 360 to access point A which is access point 283. It is to be noticed that the sequence of operations just described will be repeated until decision means 284 makes the decision that there are no more offers to print. Then the sequence will be routed through decision means 284 via branch 285 through manual operation means 286 via branch 287 to the terminal 288 thus terminating the sequence of operations performing the Book Print.

Another function which is performed by the data processing subsystem of the present invention is Action Verify. This function verifies the data which is put in a message which is to be transmitted in the system. A logic flow chart for the means and sequence of operations to achieve Action Verify followed by the data processing subsystem of this invention is shown in FIG. 4. The sequence of operations is initiated when the data comprising the message to be verified enters the input manual operation means 400 via branch route 402. The sequence is routed via branch 404 to process means 406. Process means 406 verifies the data in the message. The sequence is routed via branch 408 to process means 410. Process means 410 has access to the data storage unit 132. The process unit 410 obtains the Book for the security which is the subject of the message which is to be verified. The sequence is routed via route 412 to decision means 414. Decision means 414 makes the decision whether the security in question is on HOLD by the SEC. If the decision is that the security which comprises the message to be verified is on HOLD by the SEC, then the sequence is routed via branch 416 to manual operation means 418. Manual operation means 418 will print the message that the security is on HOLD by the SEC. The sequence is then routed via branch 419 to terminal 420 and is terminated. If, on the other hand, the decision is that the security is not on HOLD by the SEC, the sequence is routed via branch 421 to decision means 422. Decision means 422 makes the decision whether the information concerning the original offer referenced by the message to be verified is needed. If the decision is that the original offer information is not needed, the sequence is routed via branch 424 to reference point A. Reference point A is described hereinbelow. If, on the other hand, the decision is that the original offer information is needed, then the sequence is routed via branch 426 to process means 428. Process means 428 has access to the Book on the security which is the subject of the message to be verified and which was obtained from the data storage unit 132 by process means 410. Process means 428 retrieves the information needed from the original offer from the Book. The sequence is then routed via branch 430 to decision means 432. Decision means 432 makes the decision whether the offer to which the message which is to be verified relates has expired or has been deleted. If the decision is that said offer has expired or has been deleted, the sequence is routed via branch 434 to manual operation means 436. The manual operation means 436 prints the message that the original offer has expired or has been deleted. The sequence is then routed via branch 437 to terminal 438 and is terminated. If, on the other hand, the decision is that the original offer has not expired and has not been deleted, the sequence is routed via branch 439 to manual operation means 440. The sequence is routed from manual operation means 440 to terminal 442 via branch 441 where it is terminated. Branch 439 is accessed by access point 443 which is referenced by A. It is to be noticed that if the message which is to be verified is a Book, Broadcast that decision means 422 would route the sequence via branch 424 to reference point A which is 443. However, if the message to be verified is an Accept, Withdraw, Remove Hold, Revise, Limited Broadcast, Reply then the decision means 422 would route the sequence via branch 426 to process means 428 and via branch 430 to decision means 432.

Another function which is performed by the data processing subsystem of this invention is the Book or Book and Broadcast function. A logic flow chart illustrating the means and sequence used by this invention for providing the Broadcast and/or Book & Broadcast function is shown in FIG. 5. The sequence of operations is initiated by routing the sequence into process means 500 via branch 502. Process means 500 has access to the data processing unit 132 and will obtain the Book corresponding to the security which is desired to be booked. The sequence is then routed via branch 504 to decision means 506. Decision means 506 makes the decision whether the security in question is on HOLD by the system. If the decision is yes the security is on HOLD, then the sequence is routed via branch 508 to manual operation means 510. Manual operation means 510 will send a security HOLD message to the subscriber who has attempted to book this offer. The sequence will then be routed via branch 512 to terminal 514. Terminal 514 terminates the sequence of operations. If, on the other hand, the decision made by decision means 506 is that the security in question is not on HOLD, then the sequence will be routed via branch 516 to process means 518. Process means 518 will update the offer number. The sequence will then be routed via branch 520 to manual operation means 522. Manual operation means 522 will send a Book entry message to the subscriber who is entering into the present Book. The sequence is then routed via branch 524 to manual operation means 526. Manual operation means 526 will send a Book entry message to the console 220. The sequence is then routed via branch 528 to manual operation means 530. Manual operation means 530 has access to the data storage unit 132 and will obtain the Book corresponding to the security which is the subject of the present Book function. The sequence is now routed via branch 532 to decision means 534. Decision means 534 makes the decision whether the offer to be booked is a buy offer. If the decision is no this is not a buy offer, i.e., it is a sell offer, the sequence is routed via branch 536 to process means 538. Process means 538 stores the sequence table and total number of buy offers in the Book corresponding to the security. The sequence is then routed via branch 540 to reference point A. Reference point A is described hereinbelow. If the decision made by decision means 534 is that the offer which is to be booked is a buy offer, then the sequence is routed via branch 542 to process means 544. Process means 544 stores the sequence table and total number of sell offers in the Book corresponding to the security. The sequence is then routed via route 546 to reference point A. Reference point A is denominated by 548 and the sequence coming to reference point A548 is routed to decision means 550 via branch 549. Decision means 550 decides whether all of the Book offers in the Book corresponding to the security to be booked have been checked to effectuate an automatic transaction. If the decision is yes all of the book offers have been so checked, then the sequence is routed via branch 552 to reference point G. Reference point G is described hereinbelow. If, on the other hand, all of the book offers have not been so checked, then the sequence is routed via branch 554 to process means 556. Process means 556 will scan the Book corresponding to the security which is to be booked and obtain the next book offer with the view of effectuating an automatic transaction. The sequence is then routed via branch 558 to decision means 560. Decision means 560 will examine whether that offer is on HOLD. If the decision is yes the offer is on HOLD, then the sequence is routed via branch 562 to reference point A548. If, on the other hand, the decision is that the offer in the Book which is being examined is not on HOLD, then the sequence will be routed via branch 564 to decision means 566. Decision means 566 makes the decision whether the offer being examined in the Book has expired. If the decision is that the offer in the Book has expired, then the sequence will be routed via branch 568 to reference point A548. If the offer has not expired, the sequence is routed via branch 570 to decision means 572. Decision means 572 will compare the price associated with the offer to be booked with the price associated with the book entry offer. If the decision is that the price associated with the offer to be booked is lower than the price associated with the Book entry offer being examined, then the sequence is routed via branch 574 to reference G. Reference G is described hereinbelow. If, on the other hand, the price of the offer to be booked is equal to or higher than the price of the Book entry offer being examined then the sequence is routed via branch 576 to decision means 578. Decision means 578 will compare the quantity of the offer to be booked with the quantity of the Book entry offer being compared. If the quantity of the offer being booked is higher than the quantity of the book entry offer being compared, then the sequence will be routed via branch 580 to decision mans 582. Decision means 582 compares the quantity of the Book entry offer with the minimum quantity of the offer to be booked. If the quantity of the Book entry offer is lower than the minimum of the offer to be booked, the sequence is routed from decision means 582 via branch 584 to reference point A548. If, on the other hand, the quantity of the book entry offer is equal to or higher than the minimum of the quantity of the offer to be booked, then the sequence is routed via branch 586 to reference point B designated 587. If the decision made by decision means 578 is that the quantity of the offer to be booked is equal to the quantity of the Book entry offer being compared, then the sequence is routed via branch 588 to reference point B587. If, on the other hand, the quantity of the offer to be booked is lower than the quantity of the Book entry offer being compared, then the sequence is routed via branch 592 to reference point F593. The sequence is routed from reference point F593 via branch 594 to decision means 595. Decision means 595 compares the quantity of the offer to be booked with the minimum quantity of the book entry offer being compared. If the quantity of the offer to be booked is lower than the minimum quantity of the book entry offer being compared, the sequence is routed from decision means 595 via branch 596 to reference point A548. If, on the other hand, the quantity of the offer to be booked is equal to or higher than the minimum quantity of the book entry offer being compared, the sequence is routed via branch 597 to reference point B587. The sequence is routed from reference point B587 via branch 598 to manual operation means 599. Manual operation means 599 will send a transaction notice to the subscriber who is booking the offer and the subscriber who had already booked the Book entry offer which is being compared. The sequence is then routed via branch 600 to manual operation means 601. Manual operation means 601 will send the same transaction message to the console 220. The sequence is then routed via branch 602 to manual operation means 604. Manual operation means 604 will enter the completed transaction in the transaction journal which is maintained in the data storage unit 132. The sequence is then routed via branch 606 to process means 608. Process means 608 will adjust the quantities of the offer to be booked and the Book entry offer which has been compared to reflect the completed and automatic transaction. THe sequence is then routed via branch 610 to decision means 612. Decision means 612 then makes the decision whether the Book entry offer which has just been compared with the offer to be booked is complete. If the decision is that the Book entry offer which has just been compared is complete, then the sequence is routed via branch 614 to reference point D hereinbelow designated 640. Reference point D is described hereinbelow. If, on the other hand, the decision is that the Book entry offer which has just been compared is not complete, then the sequence is routed via branch 616 to reference C618. The sequence is routed from reference C618 to decision means 620 via branch 622. Decision means 620 makes the decision whether the Book entry offer which has just been compared is above the minimum required by the system. If the decision that the Book entry offer is now above the minimum required by the system then the sequence is routed via branch 624 to reference E. Reference E is described hereinbelow. If, on the other hand, the decision is that the Book entry offer is not now above the minimum required by the system, then the sequence is routed via branch 626 to manual operation means 628. Manual operation means 628 will send a withdrawal notice to the subscriber who booked the Book entry offer which has just been compared, and which has just been found to be below the minimum accepted by the system. The sequence is then routed via branch 630 to manual operation means 632.

Manual operation means 632 will send the same message as manual operation means 628 to the console 220. The sequence is then routed via branch 634 to manual operation means 636. Manual operation means 636 will then send the withdrawal to the withdrawal journal. Sequence is then routed via branch 638 to reference D640. The sequence is routed from reference point D640 via branch 642 to process means 644. The process means 644 has access to the Book and will delete the book entry offer which has been found to be below the minimum quantity accepted by the system. The sequence is then routed via branch 646 to reference point E648. The sequence is routed from reference E to decision means 650 via branch 652. The decision means 650 makes the decision whether the offer to be booked is now completed. If the decision is that the offer to be booked is now completed then the sequence will be routed via branch 654 to a reference point 0. Reference point 0 will be described hereinbelow. If, on the other hand, the decision is that the offer to be booked is not now completed, then the sequence will be routed via branch 656 to decision means 658. Decision means 658 makes the decision whether the offer to be booked is now above the minimum required by the system. If the decision is that the offer to be booked is now above the minimum required by the system, then the sequence is routed via branch 660 to reference point A548. If, on the other hand, the decision is that the offer to be booked is not now above the minimum required by the system, the sequence will be routed via branch 662 to manual operation means 664. Manual operation means 664 will send a withdrawal notice to the subscriber who is now trying to Book the offer to be booked. The sequence is routed via branch 666 to manual operation means 668. Manual operation means 668 will send the same withdrawal message to the console 220. The sequence is then routed via branch 670 to manual operation means 672. Manual operation means 672 will put the withdrawal notice in the withdrawal journal. The sequence is then routed via branch 674 to terminal 676 which represents the end of the sequence of operations. The sequence which is routed via branches 552 and 574 to reference point G designated by 678 is routed from reference point G678 via branch 680 to decision means 682. Decision means 682 makes the decision whether the offer to be booked is a buy offer. If the decision is that the offer to be booked is not a buy offer, then the sequence is routed via branch 684 to reference point H. Reference point H is described hereinbelow. If, on the other hand, the decision is that the offer to be booked is a buy offer, the sequence is routed via route 686 to process means 688. Process means 688 has access to the Book and will store the total number of buy offers on the buy side of the Book. The sequence is then routed via branch 690 to process means 692. Process means 692 then reverses the sign of the price contained in the offer to be booked for sequencing. The sequence is then routed via branch 694 to reference point I. Reference point I is described hereinbelow. The sequence routed via branch 684 to reference point H designated by 696 is routed via branch 698 to process means 700. Process means 700 will store the total number of sell offers on the sell side of the Book. The sequence is then routed via branch 702 to reference point I designated by 704. The sequence is routed from reference point I704 via branch 706 to decision means 708. The decision means 708 makes the decision whether all of the Book offers have been checked for the purpose of sequencing the offer to be booked in the Book. If the decision is that all of the Book offers have been so checked, then the sequence is routed via branch 710 to reference point K. Reference point K is described hereinbelow. If, on the other hand, all the Book offers have not been so checked then the sequence is routed via branch 712 to process means 714. Process means 714 has access to the Book and obtains from the Book the next Book entry offer to be checked for the purpose of sequencing. The sequence is then routed via branch 716 to reference point J designated by 718. The sequence is routed from reference point J718 via branch 720 to decision means 722. Decision means 722 will compare the price of the offer to be booked with the price of the Book entry offer which is being compared for sequencing. If the price of the offer to be booked is even with or higher than the price of the Book entry offer being compared, then the sequence is routed via branch 724 to reference point I, designated by 704. If, on the other hand, the price of the offer to be booked is lower than the price of the Book entry offer which is being compared, then the sequence is routed via branch 726 to reference point K designated by 728. The sequence is routed from reference point K728 via branch 730 to process means 732. Process means 732 has access to the Book and will insert the offer to be booked in the Book before the Book entry offer with which it has just been compared. The sequence is then routed via branch 734 to decision means 736. Decision means 736 then makes the decision whether the subscriber who has just booked the offer to be booked has a total of 11 offers on this side of the Book. If the decision is no, that the subscriber does not have 11 offers, the sequence will be routed via branch 738 to reference point M. Reference point M is described hereinbelow. If, on the other hand, the decision is that the subscriber does have 11 offers on this side of the Book, the sequence will be routed via branch 740 to process means 742. Process means 742 has access to the Book and will withdraw from the Book the 11th offer of the particular subscriber which is listed on this side of the Book. The sequence is then routed via branch 744 to reference point L designated by 746. The sequence is routed from reference point L746 via branch 748 to manual operation means 750. Manual operation means 750 will send a withdrawal notice to the subscriber who originally booked the offer which has now been dropped. The sequence is then routed via branch 752 to manual operation means 754. Manual operation means 754 will send the same message as was sent by manual operation means 750 to the console 220. The sequence is then routed via branch 756 to manual operation means 758. Manual operation means 758 will send a notice of the withdrawal of the offer which has just been dropped to the withdrawal journal. The sequence is then routed via branch 760 to reference point M 762. The sequence is routed from reference point M762 via branch 764 to decision means 766. Decision means 766 makes the decision whether there are now 30 offers on this side of the Book. If the decision is no that there are not now 30 offers on this side of the Book, the sequence will be routed via branch 768 to reference point N. Reference point N is described hereinbelow. If, on the other hand, the decision is that there are now 30 offers on this side of the Book, the sequence is routed via branch 770 to process means 772. Process means 772 has access to the Book and will withdraw the 30th offer from the side of the Book that now has 30 offers. The sequence is then routed via branch 774 to reference point L746. The sequence which is routed via branch 768 to reference point N designated by 776 is routed via branch 778 to decision means 780. Decision means 780 makes the decision whether the Book which has just been entered is also a Broadcast. If it is not also a Broadcast, the sequence is then routed via branch 782 to reference point 0. Reference point 0 is described hereinbelow. If, on the other hand, the decision is made that this is also a Broadcast, the sequence is routed via branch 784 to manual operation means 786. Manual operation means 786 will Broadcast the Book entry which has just been entered to all of the subscribers in the system. The sequence is then routed via branch 788 to manual operation means 790. Manual operation means 790 will then enter the Broadcast message which has just been transmitted by manual operation means 786 into the Broadcast journal. The sequence is then routed via branch 792 to reference point 0794. The sequence is routed from reference point via branch 796 to terminal 798. Terminal 798 represents the end of the sequence of operations to effectuate the Book and/or Book & Broadcast function.

Another function which is performed by the data processing subsystem of this invention is the offer Withdrawal function. a logic flow chart illustrating the means and sequence used by this invention for providing the Withdrawal function is shown in FIG. 6. The sequence of operations is initiated when the message requesting a Withdrawal is received by the computer 130. When such a message is received by the computer 130 an input is provided to the manual operation means 800 via branch route 802. The sequence is then routed via branch 804 to process means 806. The process means 806 has access to the data storage unit 132. Since the security reference code number of the security which is the subject of the offer which is sought to be Withdrawn is an input to the sequence, the process means 806 locates within the data storage unit 132 the Book which corresponds to said security. Once the appropriate Book is accessed by the process means 806, the sequence is then routed via branch 808 to decision means 810. The decision means 810 makes the decision whether the security in question is on HOLD by the SEC. If the decision is yes the security is on HOLD by the SEC, the sequence is routed via branch 812 to manual operation means 814. Manual operation means 814 then sends a message to the subscriber who is attempting to Withdraw his original offer, that the security in question is on HOLD by the SEC. The sequence is then routed via branch 815 to terminal 816 where it is terminated. If, on the other hand the decision is no the security in not on HOLD by the SEC, the sequence is routed via branch 817 to process means 818. Process means 818 has access to the Book which has been accessed by process means 806. Since the offer reference code number of the offer which is sought to be Withdrawn is an input to the sequence, the process means 818 locates the corresponding offer in the Book. Once the appropriate offer is accessed by the process means 818, the sequence is then routed via branch 820 to decision means 822. Decision means 822 makes the decision whether the offer which is sought to be withdrawn has expired. If the decision is yes the offer sought to be withdrawn has expired, the sequence is routed via branch 824 to manual operation means 826. The manual operation means 826 will send a message that the offer which is sought to be withdrawn has expired. The sequence is then routed via branch 827 to terminal 828 where it is terminated. If, on the other hand, the decision is that the offer which is sought to be withdrawn has not expired, then the sequence is routed via branch 829 to decision means 830. The decision means 830 makes the decision whether the subscriber who is now seeking to Withdraw the offer is the same subscriber who originally entered the offer. If the decision is no it is not the same subscriber, then the sequence is routed via branch 832 to manual operation means 834. Manual operation means 834 will send a message indicating that the subscribers are not the same. The sequence is then routed via branch 835 to terminal 836 where it is terminated. If, on the other hand, the decision is that they are the same subscribers, then the sequence is routed via branch 837 to process means 838. Process means 838 will delete the offer in question from the offer file corresponding to the security in question. The sequence is then routed via branch 840 to manual operation means 842. Manual operation means 842 will print a withdrawal notice which will be sent to the originator of the offer. The sequence is then routed via branch 844 to process means 846. Process means 846 will send a similar message to the console 220. The sequence is then routed via branch 848 to decision means 850. Decision means 850 makes the decision whether the offer which has just been withdrawn was originally broadcast when entered. If the decision is no it was not originally broadcast, the sequence is routed via branch 852 and branch 860 to terminal means 854, where the sequence will terminate. If, on the other hand the decision means 850 makes the decision that the offer was broadcast when originally entered, the sequence is routed via branch 856 to manual operation means 858. Manual operation means 858 will broadcast the withdrawal notice to all subscribers in the system. The sequence will then be routed via branch 860 to terminal means 854 where the sequence will terminate.

Another function which is performed by the data processing subsystem of the present invention is offer Revision. This function revises the price data contained in an offer which has been booked. A logic flow chart for the means and sequence of operation followed by the date processing subsystem of this invention to achieve Revision is shown in FIG. 7. The sequence of operation is initiated when the data comprising the message containing the Revision enters the input manual operation means 900 via branch route 902. The sequence is routed via branch 904 to process means 906. The process means 906 has access to the data storage unit 132. Since the security reference code number of the security which is contained in the original offer is an input to this sequence, the process means 906 locates within the data storage unit 132 the Book which corresponds to the security of the offer now being revised, Once the appropriate Book is accessed by the process means 906, the sequence is routed via branch 908 to decision means 909. Decision means 909 makes the decision whether the security of the offer which is to be revised is on HOLD. If the decision is yes the security is on HOLD, the sequence is routed via branch 910 to manual operation means 911. Manual operation means 911 will send a message to the subscriber that the security of the offer to be revised is on HOLD. The sequence will then be routed via branch 912 to terminal 913 which will terminate the sequence, If, on the other hand, the decision made by decision means 909 is that the security is not on HOLD, the sequence is routed via branch 914 to process means 915. Process means 915 has access to the Book which has been accessed by process means 906. Since the offer reference code number of the offer to be revised is an input to this sequence, the process means 915 locates within said Book the offer to be revised. Once the appropriate offer is accessed by the process means 915, the sequence is routed via branch 916 to decision means 917. Decision means 917 makes the decision whether the offer to be revised has expired or has been deleted. If the decision is yes, the offer to be revised has expired or has been deleted, the sequence is routed via branch 918 to manual operation means 919. Manual operation means 919 will send a message that the offer to be revised has expired or has been deleted. The sequence is then routed via branch 920 to terminal 921 where it is terminated, If, on the other hand, the decision of decision means 917 is that the offer has not expired or has not been deleted, the sequence is routed via branch 922 to decision means 925. Decision means 925 makes the decision whether the subscriber who is now seeking to Revise the offer is the same subscriber who originally entered the offer. If the decision is no, it is not the same subscriber, then the sequence is routed via branch 926 to manual operation means 927. Manual operation means 927 will send a message indicating that the subscribers are not the same. The sequence is then routed via branch 928 to terminal 929 where it is terminated. If, on the other hand, the decision is that they are the same subscriber, the sequence is then routed via branch 930 to decision means 931. Decision means 931 makes the decision whether the revision to be made is in the direction of the market. That is to say, in the case of a revision of a buy offer, that the revision is an upward revision of the price, and in the case of a revision of a sell offer, that the revision is a downward revision of the price. These are the only revisions of an offer allowed by this embodiment of the invention. If the decision by decision means 931 is no, that the revision to be made is not in the direction of the market, the sequence is routed via branch 932 to manual operation means 933. Manual operation means 933 will send a message indicating that the revision to be made is not in the direction of the market. The sequence is then routed via branch 934 to terminal 935 where it is terminated. If, on the other hand, the decision of decision means 931 is that the revision to be made is in the direction of the market, the sequence is routed via branch 936 to decision means 937. Decision means 937 makes the decision whether the offer to be revised is on HOLD. If the decision is that the offer to be revised is on HOLD, the sequence is routed via branch 938 to manual operation means 939. Manual operation means 939 will send a message to the subscriber that the offer which he desires to have revised is in a HOLD status. The sequence is then routed via branch 940 to terminal 941 where the sequence is terminated. If, on the other hand, decision means 937 makes the decision that the offer to be revised is not on HOLD, the sequence is then routed via branch 942 to process means 943. Process means 943 will delete the old offer from the offer file. The sequence is then routed via branch 944 to manual operation means 945. Manual operation means 945 will send a message indicating the revision to the subscriber who has revised the offer. The sequence is then routed via branch 946 to manual operation means 947. Manual operation means 947 will send a similar message to the console 220. The sequence is then routed via branch 948 to manual operation means 950. Manual operation means 950 will list the revision just made in a listing which is maintained by the present invention of all revisions that are accomplished by the system. The sequence is then routed via branch 952 by process means 954 to branch 532 of the sequence of operations which is shown in FIG. 5 and which is used by the present invention to accomplish Booking of an offer. The sequence which has just revised a given offer will then go through the same series of steps from branch 532 forward in FIG. 5 so that the revised offer may be properly sequenced in the Book corresponding to the security in question.

Another function which is performed by the data processing subsystem of this invention is the Accept offer function. A logic flow chart illustrating the means and sequence used by this invention for providing the Accept offer function is shown in FIG. 8. The sequence is initiated when a message accepting an existing offer is received by the computer 130. When such a message is received by the computer 130 an input is provided to the manual operation means 1000 via branch route 1002. The sequence then moves via branch 1004 to process means 1006. Process means 1006 has access to the data storage unit 132. Since the security reference code number corresponding to the offer which is to be accepted is an input to the sequence, the process means 1006 locates within the data storage unit 132 the Book which corresponds to said security. Once the appropriate Book is accessed by the process means 1006, the sequence is routed via branch 1008 to decision means 1010. The decision means 1010 makes the decision whether the security in question is on HOLD by the SEC. If the decision is yes the security is on HOLD by the SEC, the sequence is routed via branch 1012 to manual operation means 1014. Manual operation means 1014 will print a message telling the subscriber that the security which is the subject of the offer he wishes to accept is on HOLD by the SEC. The sequence is then routed via branch 1016 to terminal 1018, where the sequence is terminated. If, on the other hand, the decision of decision means 1010 is that the security in question is not on HOLD by the SEC, the sequence is routed via branch 1020 to process means 1022. Process means 1022 has access to the Book which has been accessed by process means 1006. Since the offer reference code number of the offer to be accepted is an input to this sequence, the process means 1022 locates within said Book the offer to be accepted. The sequence is then routed via branch 1024 to decision means 1026. Decision means 1026 makes the decision whether the offer which is to be accepted has expired or has been deleted. If the decision is yes the offer which is to be accepted has expired or has been deleted, the sequence is routed via branch 1028 to manual operation means 1030. Manual operation means 1030 will print a message indicating that the offer to be accepted has expired or has been deleted. The sequence is then routed via branch 1032 to terminal 1034 where the sequence is terminated. If, on the other hand, the decision is that the offer to be accepted has not expired or has not been deleted the sequence is routed via branch 1036 to decision means 1038. Decision means 1038 makes the decision whether the offer to be accepted is on HOLD, If the decision that the offer to be accepted is on HOLD the sequence is routed via branch 1040 to manual operation means 1042. Manual operation means 1042 will print out a message that the offer to be accepted is on HOLD. The sequence is then routed via branch 1044 to terminal 1046 where the sequence is terminated. If, on the other hand, the decision is that the offer to be accepted is not on HOLD, the sequence is routed via branch 1048 to decision means 1050. Decision means 1050 makes the decision whether the terms of the offer to be accepted have changed since the latest print out of the offer. If the decision is that the terms have so changed the sequence is routed via branch 1052 to manual operation means 1054. Manual operation means 1054 prints out a message which indicates that the terms of the offer to be accepted have changed. The sequence is then routed via branch 1056 to terminal 1058 where the sequence is terminated. If, on the other hand, the decision is that the terms of the offer to be accepted have not so change, the sequence is routed via branch 1060 to manual operation means 1062. Manual operation means 1062 prints a message of acceptance to the subscriber who is accepting the offer. The sequence is then routed via branch 1064 to manual operation means 1066. Manual operation means 1066 will send a similar message to the console 220. The sequence is then routed via branch 1068 to reference point A which is designated by 1070. The sequence is then routed via branch 1072 from reference point A1070 to manual operation means 1074. Manual operation means 1074 will send a transaction notice to both the subscriber who originated the offer and the subscriber who has accepted the offer. The sequence is then routed via branch 1076 to manual operation means 1078. Manual operation means 1078 will send a similar transaction notice to the console 220. The sequence is then routed via branch 1080 to process means 1082. Process means 1082 reduces the quantity of the offer in the Book by the amount of said offer which has been accepted. The sequence is then routed via branch 1084 to the decision means 1086. Decision means 1086 makes the decision whether the offer has been completely transacted by the present acceptance. If the decision is yes the quantity of the offer has been completely accepted, the sequence will be routed via branch 1088 to reference point B designated 1090. If, on the other hand, the decision is no the quantity associated with the offer has not been completely accepted the sequence is routed via branch 1092 to decision means 1094. Decision means 1094 makes the decision whether the quantity remaining and the dollar extension in the offer after the acceptance is above the system minimum, If the decision is yes the quantity remaining in the offer is above the minimums required by the system, the sequence is routed via branch 1096 to reference point C which is designated 1098. If, on the other hand, the decision is no the quantity remaining in the offer is not above the system's minimum, the sequence is routed via branch 1100 to manual operation means 1102. Manual operation means 1102 sends a withdrawal notice to the subscriber who booked the original offer notifying him that his offer has been withdrawn. The sequence is then routed via branch 1104 to manual operation means 1106, Manual operation means 1106 sends a similar message to the console 220. The sequence is then routed via branch 1108 to reference point B1090. The sequence is then routed to process means 1112 via branch 1110. Process means 1112 will delete the offer from the Book. The sequence is then routed via branch 1114 to reference point C1098. The sequence is routed from reference point C1098 via branch 1116 to terminal 1118 where the sequence is terminated.

Another function performed by the data processing subsystem of the present invention is Accept a Reply function. A logic flow chart illustrating the means and sequence used by this invention for providing the Accept a Reply function is shown in FIG. 9. The sequence of operations is initiated when a message accepting an existing reply is recieved by the computer 130. When such a message is received by the computer 130 an input is provided to the manual operation means 1200 via branch route 1202. The sequence is then routed via branch 1204 to process means 1206. The process means 1206 has access to the data storage unit 132. Since the reply reference code number of the reply to be accepted is an input to this sequence, the process means 1206 locates within the data storage unit 132 the reply file in which the reply to be accepted is located. Once the appropriate reply file is accessed by the process means 1206, the sequence is routed via branch 1208 to decision means 1210. The decision means 1210 makes the decision whether the security which is the subject of the reply to be accepted in on HOLD by the SEC. If the decision is yes the security is on HOLD by the SEC, the sequence is routed along branch 1212 to manual operation means 1214. Manual operation means 1214 will print a message to the subscriber that the security which is the subject of the reply he wishes to accept is on HOLD by the SEC. The sequence is then routed via branch 1216 to terminal 1218 where the sequence is terminated. If, on the other hand, the decision is that the security is not on HOLD by the SEC, the sequence is routed via branch 1220 to decision means 1222. Decision means 1222 makes the decision whether the reply to be accepted is in the reply file. If the decision is no the reply is not in the reply file, the sequence is routed via branch 1224 to manual operation means 1226. Manual operation means 1226 prints a message to the subscriber that the reply which he wishes to accept is no longer in the reply file. The sequence is then routed via branch 1228 to terminal 1230 where the sequence is terminated. If, on the other hand, the decision is yes the reply is in the reply file, the sequence is routed via branch 1232 to decision means 1234. Decision means 1234 makes the decision whether the reply to be accepted has expired. If the decision is yes the reply has expired, the sequence is routed via branch 1236 to manual operation means 1238. Manual operation means 1238 prints a message to the subscriber that the reply which he wishes to accept has expired. The sequence is then routed via branch 1240 to terminal 1242 where the sequence is terminated. If, on the other hand, the decision is that the reply to be accepted has not expired, the sequence is routed via branch 1244 to process means 1246. Process means 1246 obtains the offer reference code number from the sequence of the offer to which the reply to be accepted refers. The sequence is then routed via branch 1248 to process means 1250. Process means 1250 has access to the data storage unit 132. Based upon the offer reference code number obtained by process means 1246, process means 1250 locates within the data storage unit 132 the Book which corresponds to the security which is the subject of the offer referred to in the reply which is to be accepted. The sequence is then routed via branch 1252 to decision means 1254. Decision means 1254 makes the decision whether the offer referred to in the reply to be accepted has expired or has been deleted. If the decision is yes that said offer has expired or has been deleted, the sequence is routed via branch 1256 to reference point A designated 1258. If, on the other hand, the decision is that the offer referred to in the reply to be accepted has not expired or has not been deleted, the sequence is routed via branch 1264 to reference point B designated 1266. The sequence is routed from reference point B1266 via branch 1268 to decision means 1270. Decision means 1270 makes the decision whether the offer referred to in the reply to be accepted is in a HOLD status. If the decision is no said offer is not in a HOLD status, the sequence is routed via branch 1272 to decision means 1274. Decision means 1274 makes the decision whether a previous HOLD has been removed from the offer referred to in the reply to be accepted. If the decision is yes a previous HOLD has been removed, then the sequence is routed via branch 1276 to reference point A designated by 1258. If, on the other hand, the decision by decision means 1274 is that a previous HOLD has not been removed, the sequence is routed via branch 1280 to branch 1284. If the decision by decision means 1270 is yes the offer referred to in the reply to be accepted is in a HOLD status now, the sequence is routed via branch 1284 to process means 1286. Process means 1286 will reduce the quantity of the offer referred to in the reply which is accepted by the quantity contained in the acceptance, The sequence is routed from process means 1286 via branch 1290 to decision means 1292. Decision means 1292 makes the decision whether the offer referred to in the reply to be accepted has been completely transacted by the acceptance. If the decision is that the offer has been completely transacted, the sequence is routed via branch 1294 to reference point C designated 1296. If, on the other hand, the decision is no the offer has not been completely transacted, the sequence is routed via branch 1298 to decision means 1300. Decision means 1300 makes the decision whether the quantity and the dollar extension now associated with the offer referred to in the reply which has been accepted are above the system minimums. If the decision is no the quantity and dollar extensions are not above system minimums, the sequence is routed via branch 1302 to process means 1304. Process means 1304 will make the appropriate adjustments within the computer 130 to print a withdrawal notice of the offer which is not above the system minimums. The sequence is then routed via branch 1306 to reference point C1296. The sequence is routed from reference point C1296 via branch 1308 to process means 1310. Process means 1310 will delete the offer from the Book corresponding to the security which is the subject of the offer. The sequence is then routed via branch 1312 to reference point A1258. If, on the other hand, the decision made by decision means 1300 is that the quantity associated with the offer which is referred to in the reply which has just been accepted is above the system minimums the sequence is routed via branch 1316 to reference point A1258. The sequence is routed from reference point A1258 via branch 1318 to process means 1320. Process means 1320 has access to the data storage unit 132, and locates within the data storage unit 132 the reply file which corresponds to the reply which has just been accepted. Once the appropriate reply file is accessed by the process means 1320, the sequence is routed via branch 1322 to process means 1324. Process means 1324 will delete the reply just accepted from the reply file. The sequence is then routed via branch 1326 to decision means 1328. Decision means 1328 makes the decision whether the reply which was accepted was in a negotiation. If the decision is no the reply was not in a negotiation, the sequence is routed via branch 1330 to reference point D designated by 1332. If, on the other hand, the decision is that the reply which was accepted was in a negotiation the sequence is routed via branch 1334 to process means 1336. Process means 1336 will delete the reply in the reply file which relates to the negotiation in which the reply which was accepted was involved. The sequence is then routed via branch 1338 to reference point D1332. The sequence is routed form reference point D1332 via branch 1340 to manual operation means 1342. Manual operation means 1342 will print an accept notice on the subscriber's printer/receiving unit. The sequence is then routed via branch 1344 to manual operation means 1346. Manual operation means 1346 will send a similar message to the console 220. The sequence is then routed via branch 1348 to manual operation means 1350. Manual operation means 1350 will send a transaction notice to both the subscriber who has accepted the reply and the subscriber who has originated the reply. The sequence is then routed via branch 1352 to manual operation means 1356. Manual operation means 1356 will send a similar transaction notice to the console 220. The sequence is then routed via branch 1358 to decision means 1360. Decision means 1360 makes the decision whether an indicator is set to print a withdrawal notice. If the decision is no the indicator is not so set, the sequence is routed via branch 1362 through branch 1364 to terminal 1366 where the sequence is terminated. If, on the other hand, the decision made by decision means 1360 is that the indicator is set to print a withdrawal, the sequence is routed via branch 1368 to manual operation means 1370. Manual operation means 1370 will send a withdrawal notice to the subscriber. The sequence is then routed via branch 1372 to manual operation means 1374. Manual operation means 1374 will send a similar withdrawal notice to the console 220. The sequence is then routed via branch 1364 to terminal 1366 where the sequence is terminated.

Another function which is performed by the data processing subsystem of this invention is the Reply to an offer function. A logic flow chart illustrating the means and sequence used by this invention for providing the Reply to an offer function is shown in FIG. 10. The sequence of operations is initiated when a message containing a reply to an existing offer is received by the computer 130. When such a message is received by the computer 130 an input is provided to the manual operation means 1400 via branch route 1402. The sequence is then routed via branch 1404 to process means 1406. The process means 1406 has access to the data storage unit 132. Since the security reference code of the security which is the subject of the offer which is replied to is an input to the sequence, the process means 1406 locates within the data storage unit 132 the Book which corresponds to said security. Once the appropriate Book is accessed by the process means 1406, the sequence is then routed via branch 1408 to decision means 1410. The decision means 1410 makes the decision whether the security in question is on HOLD by the SEC. If the decision is yes the security is on HOLD by the SEC, the sequence is routed via branch 1412 to manual operation means 1414. Manual operation means 1414 then sends a message to the subscriber who is attempting to reply to an offer, that the security in question is on HOLD by the SEC. The sequence is then routed via branch 1416 to terminal 1418 where the sequence is terminated. If, on the other hand, the decision is no the security is not on HOLD by the SEC, the sequence is routed via branch 1420 to process means 1422. Process means 1422 has access to the Book which has been accessed by means 1406. Since the offer reference code number is an input to this sequence, the process means 1422 locates the offer in said Book which is the subject of the present reply. The sequence is then routed via branch 1424 to decision means 1426. Decision means 1426 makes the decision whether the offer which is being replied to has expired or been deleted. If the decision is yes said offer has expired or been deleted, the sequence is routed via branch 1428 to manual operation means 1430. Manual operation means 1430 will print a message to the subscriber informing him that the offer he wishes to reply to has expired or been deleted. The sequence is then routed via branch 1432 to terminal 1434 where the sequence is terminated. If on the other hand, the decision is that the offer has not expired or been deleted, the sequence is routed via branch 1436 to manual operation means 1438. Manual operation means 1438 will send a receipt of the reply to the subscriber who originated it. The sequence is then routed via branch 1440 to manual operation means 1442. Manual operation means 1442 will send a similar receipt of the reply to the console 220. The sequence is then routed via branch 1444 to decision means 1446. Decision means 1446 makes the decision whether the offer which is being replied to is on HOLD. If the decision is yes the offer is on HOLD, the sequence is routed via branch 1448 to reference point A designated 1450. If, on the other hand, the decision is no the offer is not on HOLD, the sequence is routed via branch 1452 to decision means 1454. Decision means 1454 makes the decision whether there is an automatic transaction upon receipt of the present reply. If the decision is no there is no automatic transaction, the sequence is routed via branch 1456 to reference point A1450. If, on the other hand, the decision is yes there is an automatic transaction upon receipt of the present reply, the sequence is routed via branch 1458 to process means 1460. Process means 1460 will reduce the quantity associated with the offer in the Book by the amount which has been automatically transacted by the present reply. The sequence is then routed via branch 1462 to decision means 1464. Decision means 1464 makes the decision whether the Book offer has been completely transacted. If the decision is yes the Book offer has been completely transacted, the sequence is routed via branch 1466 to reference point B designated 1468. If, on the other hand, the decision is no the Book offer has not been completely transacted, the sequence is routed via branch 1470 to decision means 1472. Decision means 1472 makes the decision whether the quantity and the dollar extension remaining with the Book offer are above the system minimums. If the decision is yes the quantity and the dollar extension are above the system minimums, the sequence is routed via branch 1474 to reference point C designated 1476. If, on the other hand, the decision is that the quantity associated with the Book offer is not above the system minimum, the sequence is routed via branch 1478 to manual operation means 1480. Manual operation means 1480 will send a withdrawal notice to the subscriber who originally booked the offer which is the subject of the present reply. The sequence is then routed via branch 1482 to manual operation means 1484. Manual operation means 1484 will send a similar withdrawal notice to the console 220. The sequence is then routed via branch 1486 to reference point B1468. The sequence is routed from reference point B1468 via branch 1488 to process means 1490. Process means 1490 will delete the offer which is the subject of the present reply from the Book. The sequence is routed via branch 1492 to reference point C1476. The sequence is routed from reference point C1476 via branch 1494 to manual operation means 1496. Manual operation means 1496 will send a transaction notice to both the subscriber who originated the offer and the subscriber who originated the present reply. The sequence is then routed via branch 1498 to manual operation means 1500. Manual operation means 1500 will send a similar transaction notice to console 220. The sequence is then routed via branch 1502 to terminal 1504 where the sequence is terminated. The present sequence may be routed to reference point A1450 from either branch 1448 or branch 1456. The sequence is routed from reference point A1450 via branch 1506 to manual operation means 1508. Manual operation means 1508 will send a receipt of reply message to the originator of the offer which is the subject of the reply. The sequence is then routed via branch 1510 to process means 1512. Process means 1512 has access to the data storage unit 132 and will obtain the reply file corresponding to the security which is the subject of the offer to which the present reply is directed. The sequence is then routed via branch 1514 to decision means 1516. Decision means 1516 makes the decision whether the reply file is full. If the decision is yes the reply file is full, the sequence is routed via branch 1518 to process means 1520. Process means 1520 will search the reply file for an expired reply. The sequence is then routed via branch 1522 to process means 1524. Process means 1524 will withdraw the expired reply from the reply file and store it. The sequence is then routed via branch 1526 to process means 1528. Process means 1528 will enter the present reply into the reply file. The sequence is then routed via branch 1530 to process means 1532. Process means 1532 has access to the data storage unit 132 and obtains the expired reply file. The sequence is then routed via branch 1534 to process means 1536. Process means 1536 will enter the expired reply which has been withdrawn from the reply file by process means 1524 into the expired reply file. The sequence is then routed via branch 1538 to terminal 1540 where the sequence is terminated. If, on the other hand, the decision by decision means 1516 is that the reply file is not full, the sequence will be routed via branch 1542 to process means 1544. Process means 1544 will enter the present reply into the reply file. The sequence is then routed via branch 1546 to terminal 1548 where the sequence is terminated.

Another function which is performed by the data processing subsystem of this invention is the Reply to a Reply function. A logic flow chart illustrating the means and sequence used by this invention for providing the Reply to a Reply function is shown in FIG. 11. The sequence of operations is initiated when a message containing a reply to a previous reply is received by the computer 130. When such a message is received by the computer 130 an input is provided to the manual operation means 1600 via branch 1602. The sequence is then routed via branch 1604 to process means 1606. Process means 1606 has access to the data storage unit 132. Since the reply reference code number of the reply which is the subject of the present reply is an input to the sequence, the process means 1606 locates within the data storage unit 132 the reply file which corresponds to said prior reply. Once the appropriate reply file is accessed by the process means 1606, the sequence is then routed via branch 1608 to decision means 1610. Decision means 1610 makes the decision whether the security which is the subject of the prior and present replies is on HOLD by the SEC. If the decision is yes the security is on HOLD by the SEC, the sequence is routed via branch 1612 to manual operation means 1614. Manual operation means 1614 will print a message to the subscriber that the security in question is on HOLD by the SEC. The sequence is then routed via branch 1616 to terminal 1618 where the sequence is terminated. If, on the other hand, the decision is that the security is not on HOLD by the SEC, the sequence is routed via branch 1622 to decision means 1624. Decision means 1624 means makes the decision whether the prior reply is in the reply file. If the decision is no the prior reply is not in the file, the sequence is routed via branch 1626 to manual operation means 1628. Manual operation means 1628 will print a message to the subscriber that the reply to which he is replying is not in the reply file. The sequence is then routed via branch 1630 to terminal 1632 where it is terminated. If, on the other hand, the decision is that the prior reply is in the reply file, the sequence is routed via branch 1634 to manual operation means 1636. Manual operation means 1636 sends a reply receipt message to the subscriber who originated the present reply. The sequence is then routed via branch 1638 to manual operation means 1640. Manual operation means 1640 sends a similar reply receipt message to the console 220. The sequence is then routed via branch 1642 to decision means 1644. Decision means 1644 makes the decision whether the reply has expired. If, the decision is yes the prior reply has expired, the sequence is routed via branch 1646 to reference point A designated 1648. If, on the other hand, the decision is no the prior reply has not expired, the sequence is routed via branch 1650 to decision means 1656. Decision means 1656 makes the decision whether there is an automatic transaction between the present reply and the prior reply. If the decision is no there is not an automatic transaction between the two replies the sequence is routed via branch 1658 to reference point A designated 1648. If, on the other hand, the decision is yes there is an automatic transaction between the two replies, the sequence is routed via branch 1662 to process means 1664. Process means 1664 has access to the data storage unit 132. Since the security reference code of the security which is the subject of the prior reply is an input to the sequence, the process means 1664 locates within the data storage unit 132 the Book which corresponds to said security. Once the appropriate Book is accessed by the process means 1664, the sequence is then routed via branch 1666 to reference point B1672. The sequence is then routed from reference point B1672 via branch 1680 to process means 1682. Process means 1682 will reduce the quantity associated with the Book offer which is referred to in the prior reply by the quantity of the present reply involved in the automatic transaction. The sequence is then routed via branch 1684 to decision means 1686. Decision means 1686 will make the decision whether the quantity now associated with the Book offer which is referred to in the prior reply has been fully transacted. If the decision is yes the Book offer has been completely transacted, the sequence is routed via branch 1688 to reference point C designated 1690. If, on the other hand, the decision is no the Book offer has not been completely transacted, the sequence is routed via branch 1692 to decision means 1694. Decision means 1694 makes the decision whether the quantity and the dollar extension which are now associated with the Book offer are above the minimums required by the system. If the decision is yes the quantity and the dollar extension are above the minimums required by the system, the sequence is routed via branch 1696 to reference point D designated 1698. If on the other hand, the decision is no the quantity and the dollar extension are not now above the system minimums, the sequence is routed via branch 1700 to manual operation means 1702. Manual operation means 1702 will send a withdrawal notice to the subscriber who originated the Book offer in question. The sequence is then routed via branch 1704 to manual operation means 1706. Manual operation means 1706 will send a similar withdrawal notice to the console 220. The sequence is then routed via branch 1708 to reference point C1690. The sequence is routed from reference point C1690 via branch 1710 to process means 1712. Process means 1712 will delete the offer from the Book. The sequence will then be routed via branch 1714 to reference point D1698. The sequence is routed from reference point D1698 via branch 1716 to manual operation means 1718. Manual operation means 1718 sends a transaction notice to both the subscriber who sent the prior reply and the subscriber who sent the present reply. The sequence is then routed via branch 1720 to process means 1722. Process means 1722 will send a similar transaction notice to the console 220. The sequence is then routed via branch 1724 to terminal 1726 where the sequence is terminated. The sequence which is routed to reference point A1648 from branch 1658 or branch 1646 is routed to manual operation means 1730 via branch 1728. Manual operation means 1730 will send a reply receipt to the originator of the prior reply. The sequence is then routed via branch 1732 to process means 1734. Process means 1734 has access to the data storage unit 132 and will obtain the reply file corresponding to the security which is the subject of the present and prior replies. The sequence is then routed via branch 1736 to decision means 1738. Decision means 1738 makes the decision whether the reply file is full. If the decision is yes the reply file is full, the sequence is routed via branch 1740 to process means 1742. Process means 1742 will search the reply file for an expired reply. The sequence is then routed via branch 1744 to process means 1746. Process means 1746 will withdraw the expired reply from the reply file and store it. The sequence is then routed via branch 1748 to process means 1750. Process means 1750 will enter the present reply into the reply file. The sequence is then routed via branch 1752 to process means 1754. Process means 1754 has access to the data storage unit 132 and obtains the expired reply file. The sequence is then routed via branch 1756 to process means 1758. Process means 1758 will enter the expired reply which has been withdrawn from the reply file by process means 1746 into the expired reply file. The sequence is then routed via branch 1760 to reference point E designated 1762. If, on the other hand, the decision made by decision means 1738 is that the reply file is not full, the sequence is then routed via branch 1764 to process means 1766. Process means 1766 will enter the present reply into the reply file. The sequence is then routed via branch 1768 to reference point E1762. The sequence is routed from reference point E1762 via branch 1770 to decision means 1772. Decision means 1772 makes the decision whether the present reply initiates a negotiation between the originator of the present reply and the originator of the prior reply. If the decision is no such a negotiation is not initiated, the sequence is routed via branch 1774 to terminal 1776 where the sequence is terminated. If, on the other hand, the decision is that such a negotiation is initiated by the present reply, the sequence is routed via branch 1778 to process means 1780. Process means 1780 has access to the data storage unit 132 and will access the Book corresponding to the security which is the subject matter of the present and prior replies. The sequence is then routed via branch 1782 to process means 1784. Process means 1784 will put the offer which is referred to in the present and prior replies in a HOLD status. The sequence is then routed via branch 1786 to terminal 1788 where the sequence is terminated.

We claim:

1. The method of automatically, anonymously and equitably buying and selling fungible properties between subscribers using an electronic computer having storage portions, comparator circuitry and other electronic circuitry and comprising the steps of:

booking unfilled buy offers including associated price and quantity parameters on a buy offer list comprised in the storage portion of the electronic computer in a priority sequence according to a first predetermined program, each of said buy offers having associated therewith a subscriber reference code designation;

booking unfilled sell offers including associated price and quantity parameters on a sell offer list comprised in the storage portion of the electronic computer in a priority sequence according to a second predetermined program, each of said sell offers having associated therewith a subscriber reference code designation;

comparing within the comparator circuitry of the electronic computer in said priority sequence, the price and quantity parameters of each incoming offer with the corresponding parameters of each offer on the complementary one of said lists;

automatically transacting within a portion of the other electronic circuitry of the electronic computer said incoming offer with the higher priority offers on said complementary list if said incoming offer can be matched against one or more offers on the complementary offer list; and booking, in the storage portion of the electronic computer, the untransacted portion of said received offer on the corresponding one of said offer lists in a priority sequence according to the corresponding one of said predetermined programs if said incoming offer cannot be completely matched against offers on the complementary offer list.

2. The method of claim 1 further comprising the steps of:

assigning unique offer identification code designations to each offer; and automatically transacting offers with reference to said identification designations so that the identification of each offer listed or filled will be by the appropriate one of said offer identification designations.

3. The method of claim 2 further comprising the steps of:

associating automatically by the electronic computer each offer identification code designation with a subscriber reference code designation and maintaining the association between each subscriber reference code designation and the identity of its corresponding subscriber in the storage portion of the electronic computer in a manner inaccessible to the other subscribers.

4. The method of claim 1 wherein:

said first predetermined program controlling the sequence of buy offer listing gives first priority to price in descending magnitude and second priority to time of entry of the buy offer, so that said step of comparing, when involving an incoming sell offer, will automatically start with the highest price buy offer on said buy offer list and will automatically compare in the comparator circuitry of the electronic computer all buy offers having the same price as a contiguous subgroup having a subgroup sequence such that earlier buy offer entries are automatically compared first; and said second predetermined program controlling the sequence of sell offer listing gives first priority to price in ascending magnitude and second priority to time of entry of the sell offer, so that said step of comparing, when involving an incoming buy offer, will automatically start with the lowest price sell offer on said sell offer list and will automatically compare in the comparator circuitry of the electronic computer all sell offers having the same price as a contiguous subgroup having a subgroup sequence such that sell offer earlier entries are automatically compared first.

5. The method of claim 4 wherein said step of automatically transacting comprises the steps of:

matching within the other electronic circuitry of the electronic computer by quantity portions of each incoming offer against complementary offers on the complementary offer list in the priority sequence of the offers on the complementary list which have an offer price equal to or better than the offer price of said incoming offer, until either all of said incoming offer has been transacted or until all of the offers in said subgroup have been transacted; and automatically transacting each matched portions of offers at the offer price of said incoming offer.

6. The method of claim 5 further comprising:

assigning unique offer identification code designations to each offer;

automatically transacting offers with reference to said identification designations so that the identification of each offer listed or filled will be by the appropriate one of said identification designations;

associating each offer identification code designation with a subscriber reference code designation; and maintaining the association between each subscriber reference code designation and the identity of its corresponding subscriber in the storage portion of the electronic computer in a manner inaccessible from the other subscribers.

7. The method of claim 1 further comprising the steps of:

reading out from the storage portion of the electronic computer one of said offer lists; and replying to selected one of the offers on the list read out.

8. The method of claim 7 further comprising the steps of:

automatically transacting said reply to said selected offer if said reply matches said selected offer as determined by the other electronic circuitry of the electronic computer;

transmitting said reply to the subscriber making said selected offer if said reply does not match said selected offer as determined by the other electronic circuitry of the electronic computer; and storing into the storage portion of the electronic computer said reply in a reply list if said reply is transmitted to said subscriber.

9. The method of claim 8 further comprising the steps of:

further replying to said prior reply;

automatically transacting said further reply if said replies match as determined by the other electronic circuitry of the electronic computer; and transmitting said further reply to the subscriber making said prior reply if said replies do not match as determined by the other electronic circuitry of the electronic computer.

10. The method of claim 9 further comprising:

assigning unique offer identification code designations to each offer;

assigning unique reply identification code designations to each reply;

automatically transacting offers with reference to said identification designations so that the identification of each offer and reply listed or filled will be by the appropriate one of said identification code designation;

maintaining the association between each subscriber reference code designation and the identity of its corresponding subscriber in the storage portion of the electronic computer in a manner inaccessible from the other subscribers.

11. The method of claim 9 further comprising the step of:

placing a hold on said selected offer in the offer list read out if said further reply does not match said prior reply as determined by the other electronic circuitry of the electronic computer to prevent said selected offer from being automatically transacted by a third party.

12. The method of claim 11 wherein said hold is automatically placed within the electronic computer on said selected offer.

13. The method of claim 1 further comprising the steps of:

broadcasting an offer incoming to the electronic computer to a plurality of subscribers over a first communication channel; and transmitting replies from said plurality of subscribers to the subscriber whose incoming offer is broadcast over a second communication channel separate from said first communication channel.

14. The method of claim 13 further comprising the steps of:

further replying over a communication channel by said subscriber whose offer is broadcast to selected ones of said subscribers making said prior replies;

automatically transacting by the electronic computer, said further reply if said replies match as determined by the other electronic circuitry of the electronic computer; and transmitting said further reply to said selected subscribers making said prior reply if said replies do not match as determined by the other electronic circuitry of the electronic computer.

15. The method of claim 14 further comprising:

assigning unique offer identification code designations to each offer and reply;

automatically transacting offers with reference to said identification designations so that the identification of each offer and reply listed or filled will be by the appropriate one of said identification designations;

associating each offer identification code designation with a subscriber reference code designation with; and maintaining the association between each subscriber reference code designation and the identity of its corresponding subscriber in the storage portion of the electronic computer in a manner inaccessible from the other subscribers.

16. The method of claim 14 further comprising the step of:

placing a hold on the broadcast incoming offer on the corresponding offer list if said replies do not match as determined by the other electronic circuitry of the electronic computer to prevent said incoming broadcast offer from being automatically transacted by a third party.

17. The method of claim 16 wherein said hold is automatically placed within the electronic computer on said broadcast offer.

18. The method of claim 13 further comprising the step of:

further replying over a communication channel by said subscriber whose offer is broadcast to selected ones of said subscribers making said prior replies.

UNITED STATES PATENT OFFICE
CERTIFICATE OF CORRECTION

Patent No. 3,573,747　　　　　　　　　Dated April 6, 1971

Inventor(s) Charles W. Adams, et al.

It is certified that error appears in the above-identified patent and that said Letters Patent are hereby corrected as shown below:

Column 5, line 9: after the period, insert --A brief description of the keyboard and code which has been adapted for this invention will provide a useful tool in understanding some of the operations of this invention. Referring to Figure 2, we see a typical keyboard of a keyboard/transmitting unit which is adapted for use in this invention. The keyboard is illustrated in Figure 2 as squares which bear reference characters 152, 154, 156, 158, 160, 162, 164, 166, 168, 170, 172, 174, 176, 178, 180, 182, 184, 186, 188, 190, 192, 194, 196, 198, 200, 202, 204, 206,--; Line 10: before "218" insert --and--.

Column 9, line 22: delete "for" and insert --from--; Line 45: before the period insert --wants to obtain a print of the Book for X Corporation stock--.

Column 13, line 32: delete the "h" after "branch".

Column 14, line 70: change "259" to --359--.

Column 15, line 60: change "443" to --442--; line 66: before "Reply" insert --or--.

Column 19, line 69: change "reference point via" to --reference point 0 via--.

Column 21, line 3: change "date" to --data--.

UNITED STATES PATENT OFFICE
CERTIFICATE OF CORRECTION

Patent No. 3,573,747                Dated April 6, 1971

Inventor(s) Charles W. Adams, et al.          PAGE 2

It is certified that error appears in the above-identified patent and that said Letters Patent are hereby corrected as shown below:

Column 23, line 15: change "change" to --changed--.

Column 24, line 8: delete "in" and insert --is--.

Column 26, line 30: change "by means" to --by process means--.

Column 27, line 18: change "is routed" to --is then routed--.

Column 28, line 16: delete "means" after "1624".

Column 31, line 55, "code" should be cancelled.

Column 30, line 41: after "designation" insert --;--.

Column 31, line 55: change "designation;" to --designations;--; before line 56 insert --and associating each offer and reply identification code designation with a subscriber reference code designation; and--

Column 32, line 39: delete "with" after "designation".

Signed and sealed this 13th day of August 1974.

(SEAL)
Attest:

McCOY M. GIBSON, JR.               C. MARSHALL DANN
Attesting Officer                  Commissioner of Patents